United States Patent
Pizzi et al.

(10) Patent No.: US 11,761,483 B2
(45) Date of Patent: Sep. 19, 2023

(54) SENSORIZED SUPPORTING DEVICE FOR BEARINGS

(71) Applicant: ELTEK S.P.A., Casale Monferrato (IT)

(72) Inventors: Marco Pizzi, Casale Monferrato (IT); Massimo Zanin, Casale Monferrato (IT); Stefano Allera, Casale Monferrato (IT)

(73) Assignee: ELTEK S.p.A., Casale Monferrato (IT)

( * ) Notice: Subject to any disclaimer, the term of this patent is extended or adjusted under 35 U.S.C. 154(b) by 181 days.

(21) Appl. No.: 17/296,132

(22) PCT Filed: Nov. 22, 2019

(86) PCT No.: PCT/IB2019/060075
§ 371 (c)(1),
(2) Date: May 21, 2021

(87) PCT Pub. No.: WO2020/105010
PCT Pub. Date: May 28, 2020

(65) Prior Publication Data
US 2022/0003268 A1 Jan. 6, 2022

(30) Foreign Application Priority Data
Nov. 22, 2018 (IT) .................. 102018000010523

(51) Int. Cl.
| F16C 19/52 | (2006.01) |
| F16C 35/04 | (2006.01) |
| G01L 5/00 | (2006.01) |

(52) U.S. Cl.
CPC .......... *F16C 19/522* (2013.01); *F16C 35/047* (2013.01); *G01L 5/0019* (2013.01); *F16C 2202/36* (2013.01); *F16C 2233/00* (2013.01)

(58) Field of Classification Search
CPC .. F16C 19/522; F16C 35/047; F16C 2202/36; F16C 2233/00; G01L 5/0019
See application file for complete search history.

(56) References Cited

U.S. PATENT DOCUMENTS 5,677,488 A * 10/1997 Monahan .............. F16C 19/527
73/660
6,360,596 B1 3/2002 Callendrier
(Continued)

FOREIGN PATENT DOCUMENTS

| CN | 102639886 A | 8/2012 |
| DE | 3413830 | 10/1984 |

(Continued)

OTHER PUBLICATIONS

Machine Translation of DE 3908175 (Year: 1989).*
(Continued)

*Primary Examiner* — Alan B Waits
(74) *Attorney, Agent, or Firm* — Nixon & Vanderhye P.C.

(57) ABSTRACT

A sensorized supporting device for bearings (1) comprises:
• a bearing housing (2), configured for being secured to a mounting structure and defining at least one seat (2c) for a bearing (3); and • a sensorized supporting base (4), having a supporting body (4') prearranged for being at least partially positioned between the mounting structure (S) and the bearing housing (2). The supporting body (4') has a detection surface (4c) which extends in a longitudinal direction (L) and a transverse direction (W) and is configured for resting, directly or via interposition of at least one further element, on a corresponding surface of one of the bearing housing (2) and the mounting structure, the supporting base (4) being provided with a mechanical-stress sensor. The mechanical-stress sensor comprises at least one piezoelectric transducer ($10_1$, $10_2$, 20) defining at least part of the detection surface (4c), the at least one piezoelectric transducer (10; 20; $10_1$, (Continued)

$10_2$) being configured for generating an electrical potential difference that is substantially proportional to the magnitude of a mechanical stress (SS) applied to the bearing housing (2).

19 Claims, 17 Drawing Sheets

(56) References Cited

U.S. PATENT DOCUMENTS

| | | | |
|---|---|---|---|
| 8,869,633 B2 | 10/2014 | Biehl et al. | |
| 2005/0147337 A1* | 7/2005 | Ostling | F16C 35/047 384/448 |
| 2012/0318071 A1* | 12/2012 | Biehl | F16C 19/52 384/129 |

FOREIGN PATENT DOCUMENTS

| | | |
|---|---|---|
| DE | 3908175 | 9/1989 |
| EP | 1 528 382 | 5/2005 |
| EP | 2 527 809 | 11/2012 |

OTHER PUBLICATIONS

International Search Report and Written Opinion of the ISA for PCT/IB2019/060075, dated Jan. 22, 2020, 16 pages.
Office Action dated Nov. 30, 2022, issued in China Application No. 201980090022.2, 13 pages.

* cited by examiner

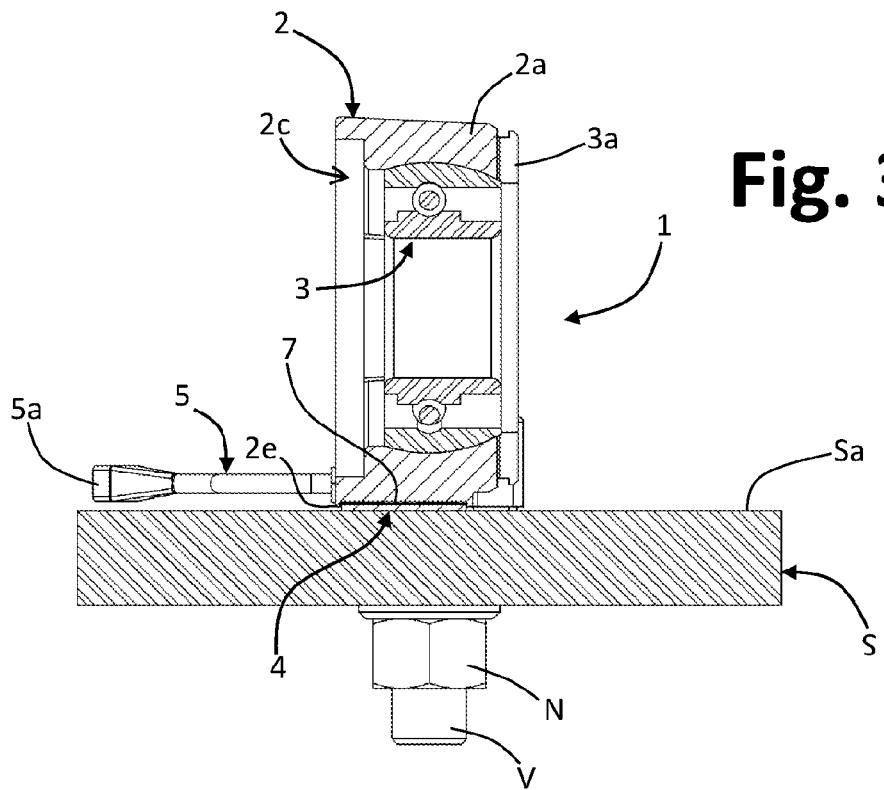
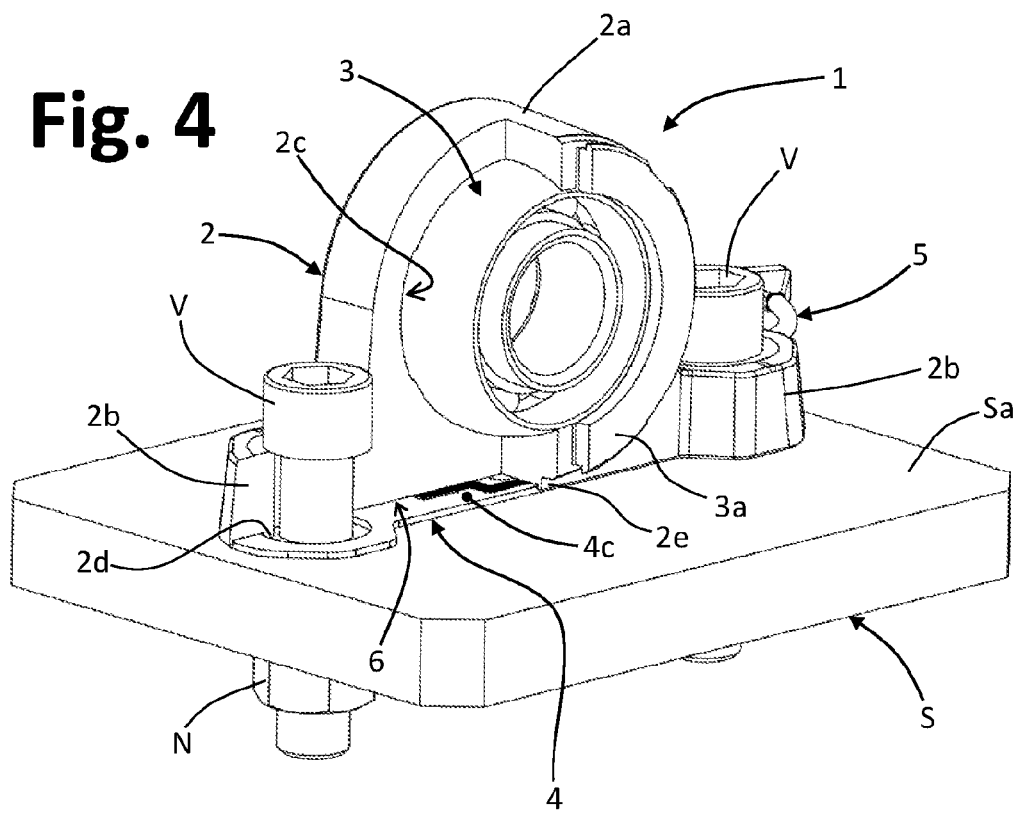

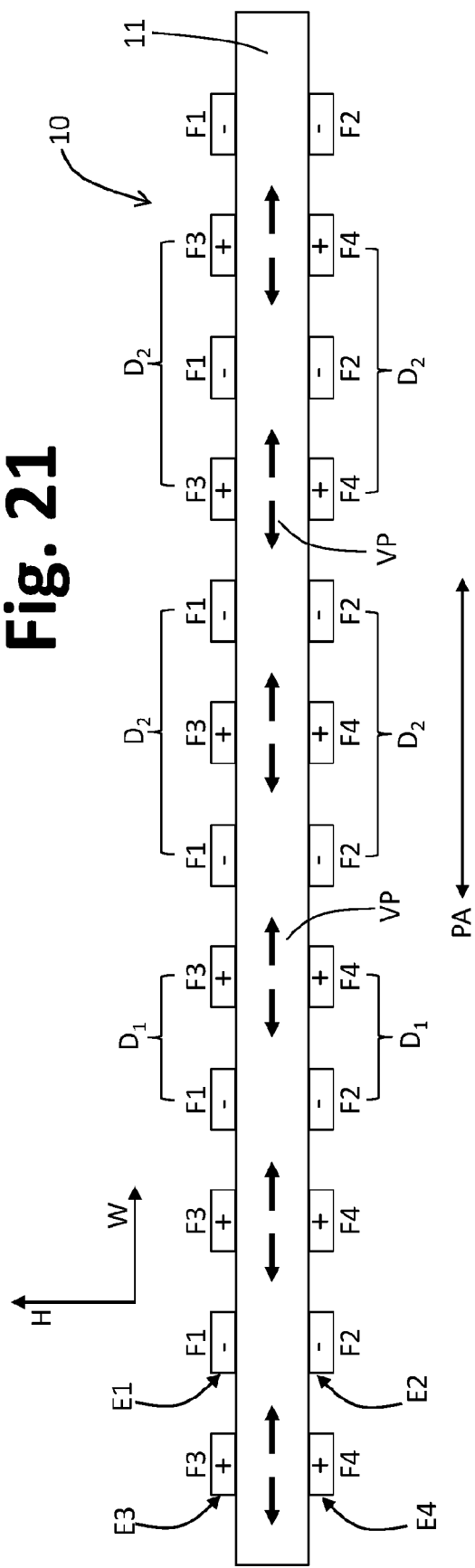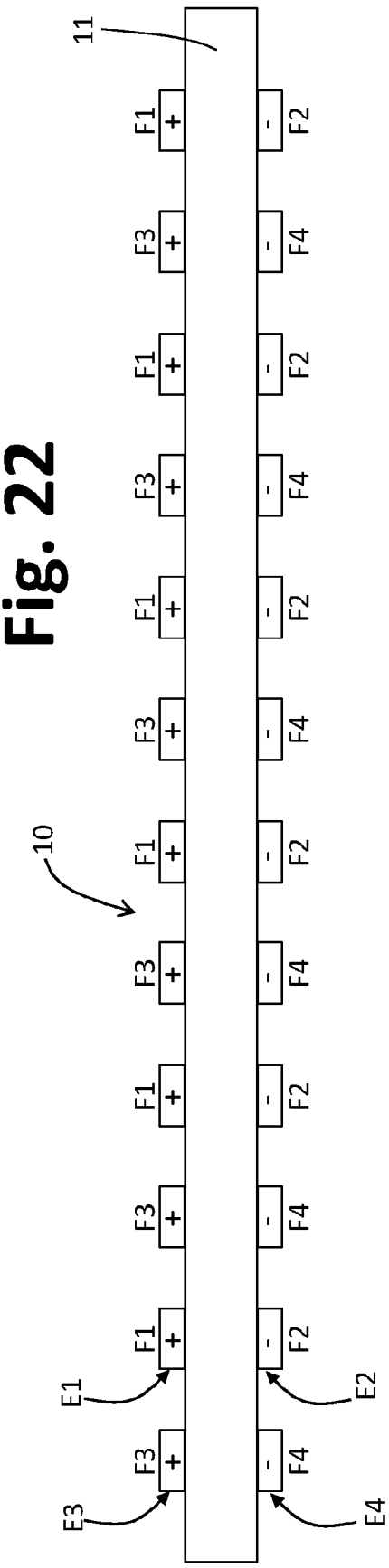

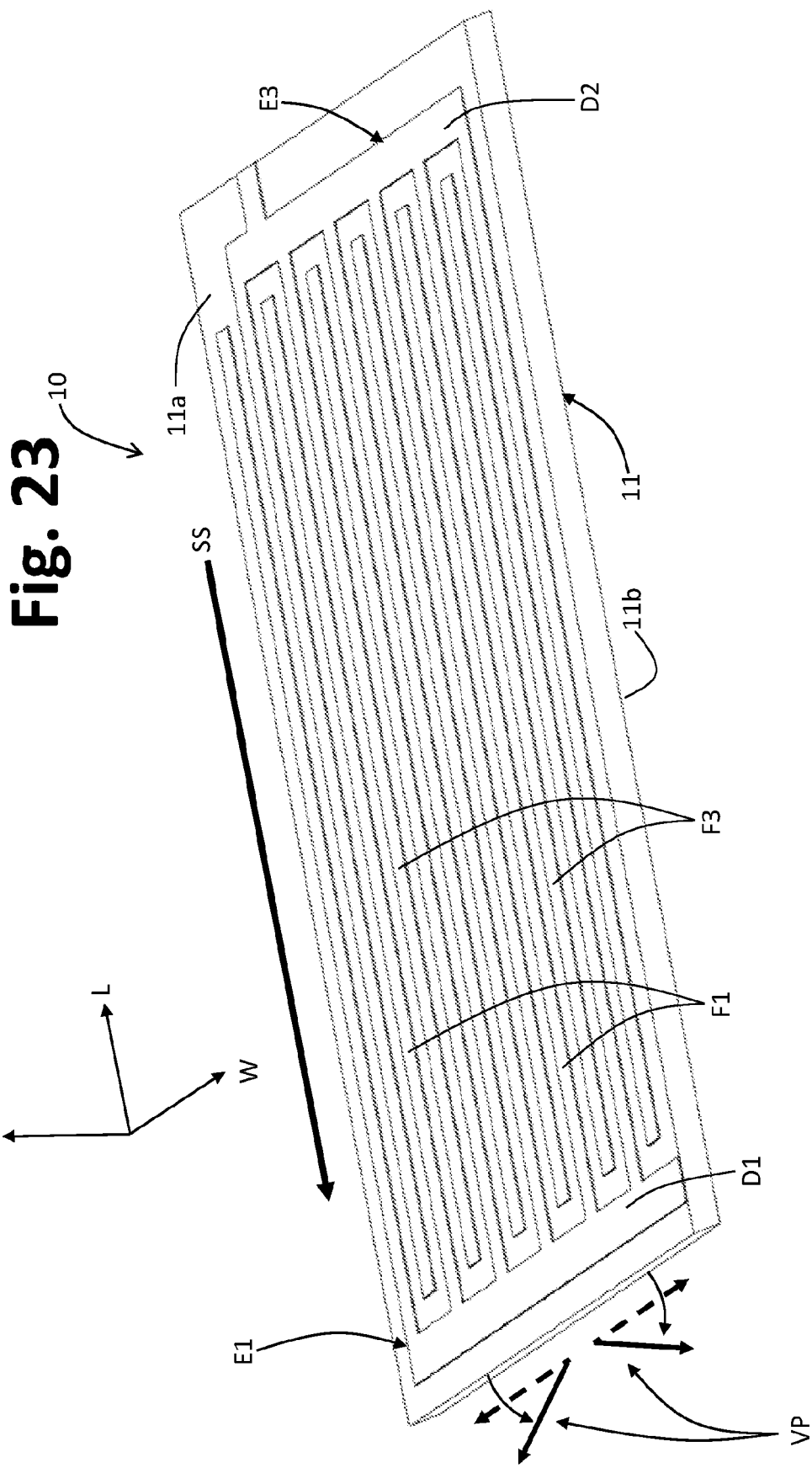

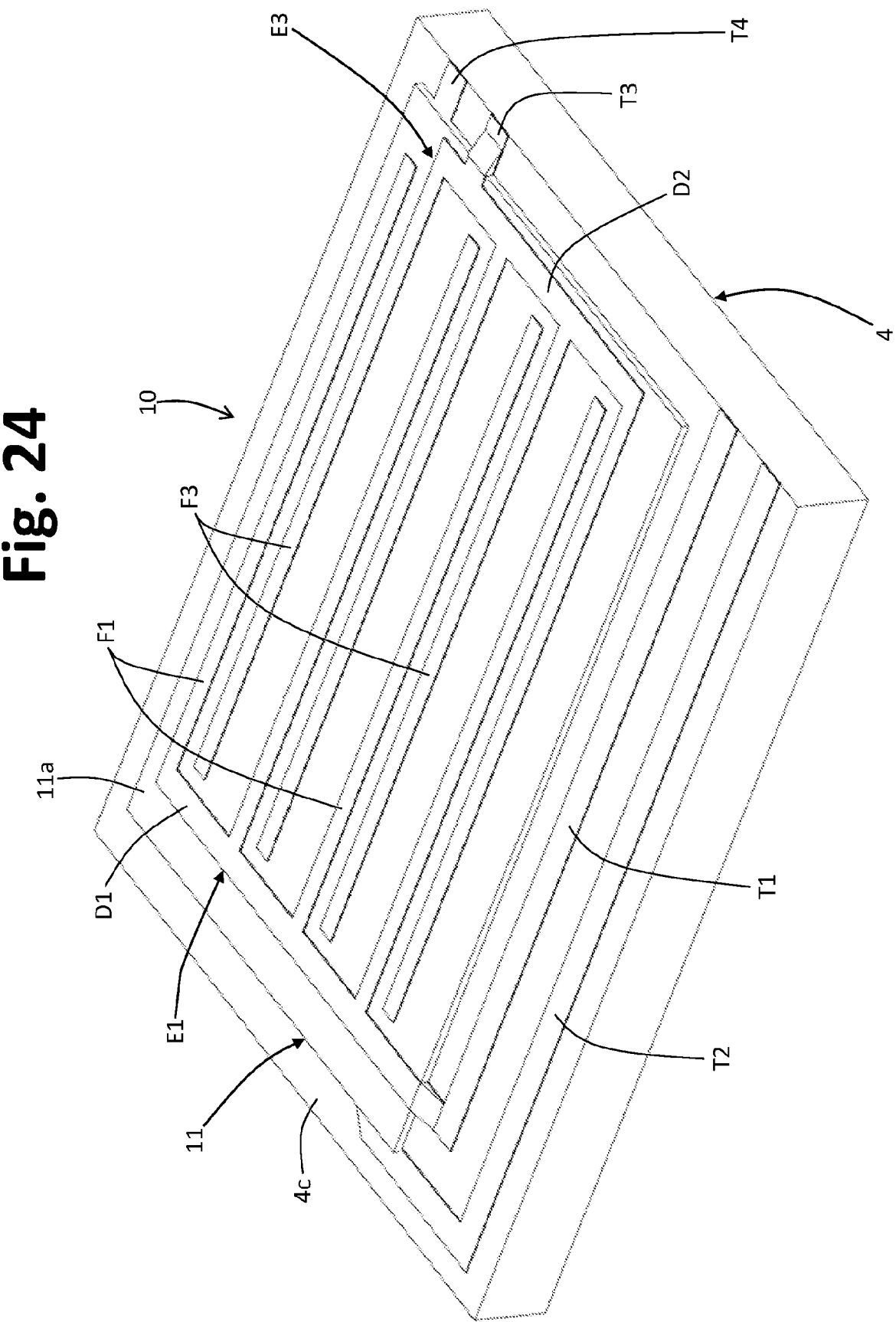

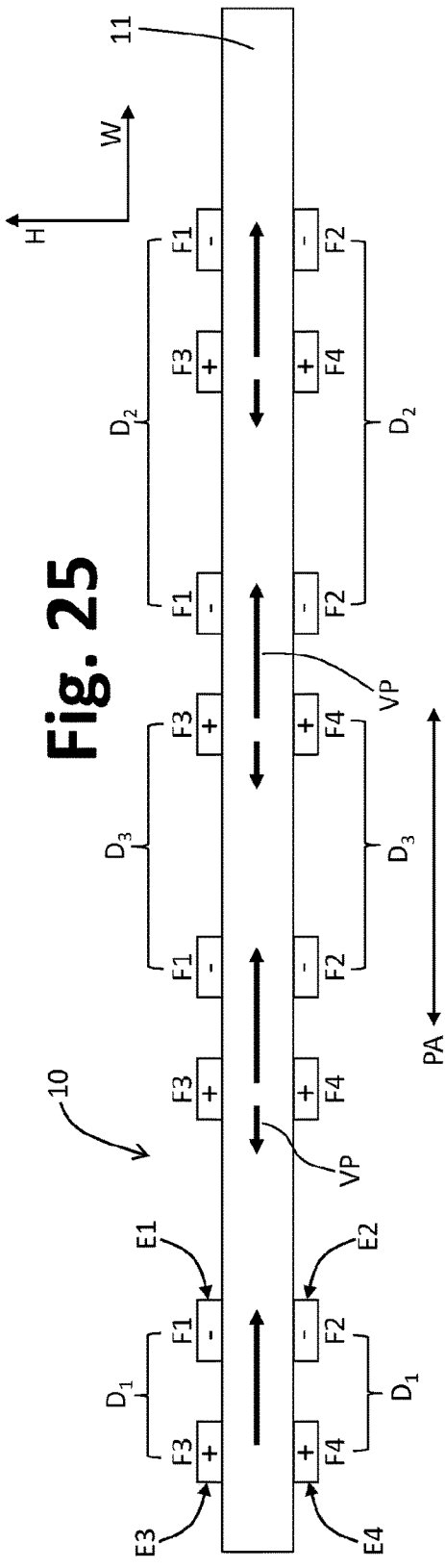
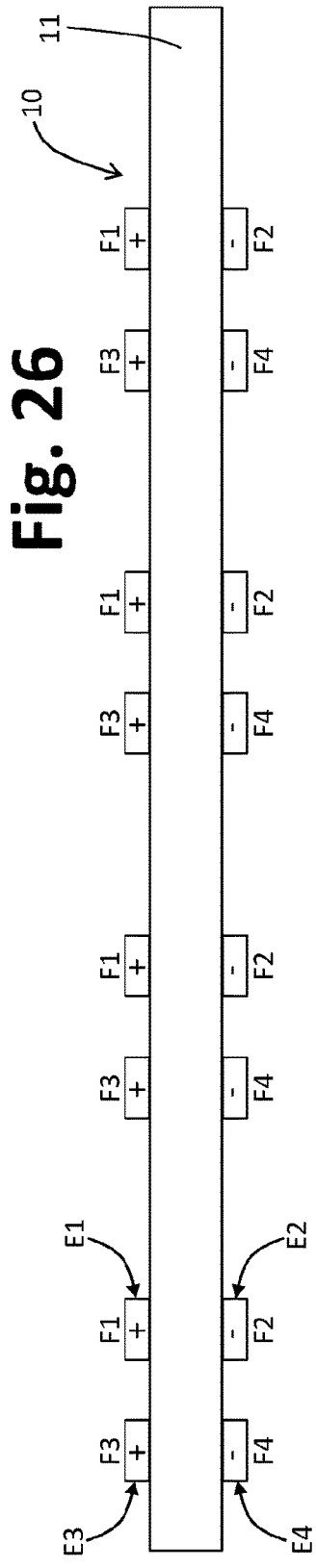
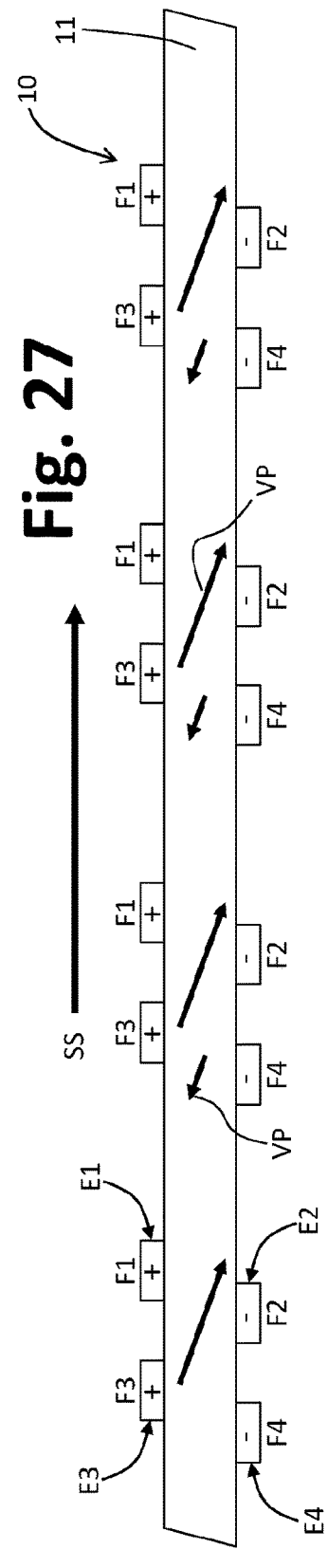

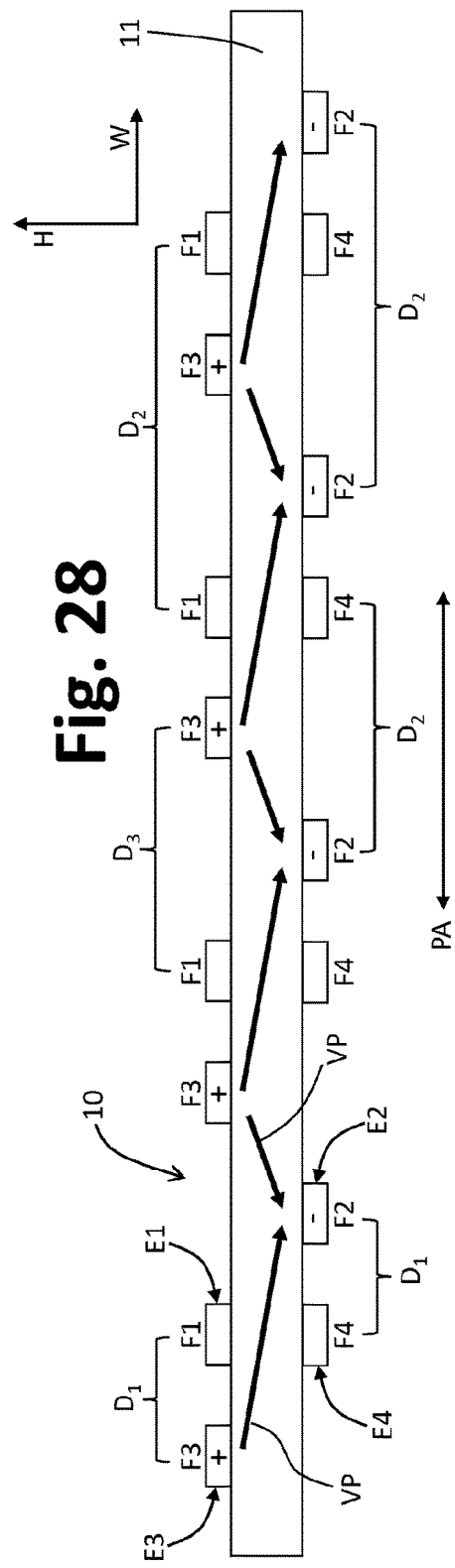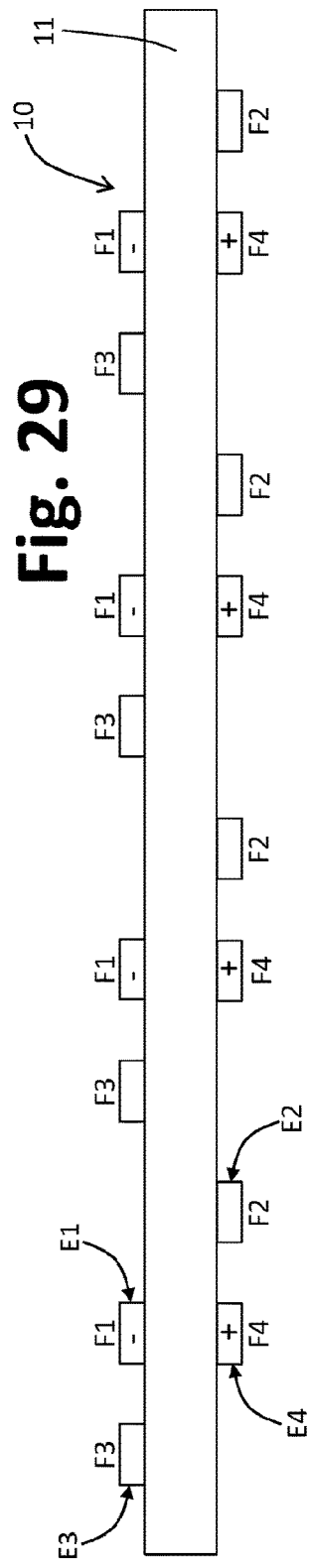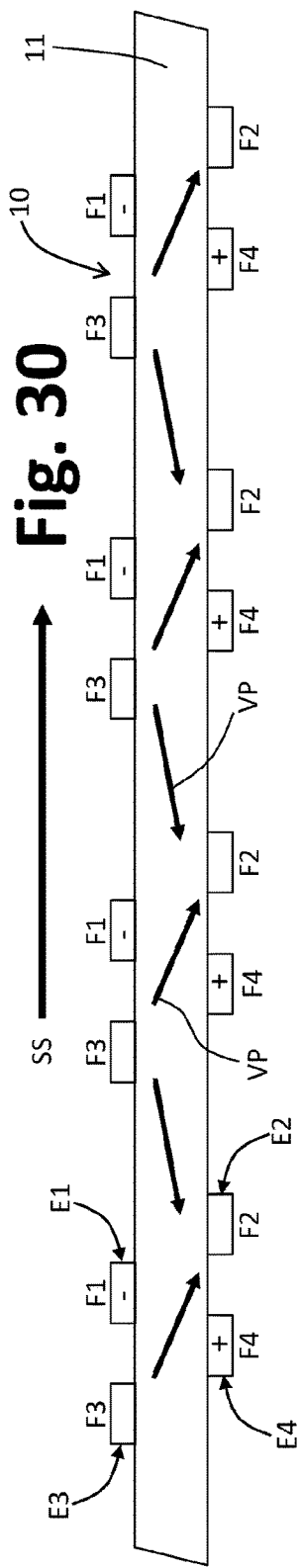

SENSORIZED SUPPORTING DEVICE FOR BEARINGS

This application is the U.S. national phase of International Application No. PCT/IB2019/060075 filed 22 Nov. 2019, which designated the U.S. and claims priority to IT Patent Application No. 102018000010523 filed 22 Nov. 2018, the entire contents of each of which are hereby incorporated by reference.

FIELD OF THE INVENTION

The present invention relates to supporting devices for bearings, comprising at least one sensor element configured for detecting a load or a stress transferred onto a bearing housing or, more in general, for detecting a vibration or an albeit minimal movement or displacement of the bearing housing, for example with respect to a mounting structure. The invention has been developed with particular reference to sensorized supporting devices, as well as to the sensorized supporting bases for such devices, having mechanical-stress sensor means, where a sensorized supporting base is preferably set at least in part between a bearing housing and a generic mounting structure, to which the housing is to be secured.

PRIOR ART

As is known, bearings are devices that are designed to enable constrained relative movement between two parts and that can be used in machinery of various types for withholding and supporting rotating components.

In use, the bearing is subjected to different loads, both static and dynamic. Static loads are typically proportional to the weight supported by the bearing, whereas dynamic loads typically depend upon the conditions of use of the bearing. In many systems it is thus desirable to be able to monitor the loads that act on a bearing: for example, in the automotive sector, information of loading of the bearings of wheel hubs may be advantageously used by systems for control of stability of a vehicle.

Vibrations represent a further parameter of some importance, which is able to provide indications on the conditions of a bearing, for example, if it is considered that excessive vibrations may be a sign of the fact that a bearing is wearing out or is approaching the end of its service life. In addition to the loads withstood by the bearing, it may hence prove useful to monitor also the corresponding vibrations.

EP 1528382 A1 discloses a supporting device for bearings comprising a bearing housing associated to which is an underlying supporting base (baseplate), equipped inside it with load-measurement means, represented by strain gauges arranged to form a Wheatstone bridge. The supporting base is relatively complex to produce since it presupposes mechanical machining operations for bestowing thereon a shape suitable for receiving the strain gauges. The supporting base must have a certain thickness, and the strain gauges are to be mounted in specific seats made in a transverse direction therein.

U.S. Pat. No. 8,869,633 B2, on which the preamble of claim 1 is based, describes a similar supporting device, which comprises a bearing housing with an underlying supporting base, which integrates measurement means constituted by piezoresistive sensors. Also in this case, the sensorized supporting base has to be machined for defining seats, housed in which are the piezoresistive sensors. The sensors used require electrical supply and have to be of adequate thickness in order to be able to yield appreciable variations of resistance. The information that can be deduced through these piezoresistive sensors is in any case relatively limited.

AIM AND SUMMARY OF THE INVENTION

In its general terms, the aim of the present invention is basically to provide a supporting device for bearing housings, with a sensorized base, that is simple to manufacture, compact and inexpensive, but distinguished by a high precision of detection and reliability of operation.

The above and other aims still, which will emerge more clearly hereinafter, are achieved according to the present invention by a detection device for bearings having the characteristics specified in the annexed claims. The claims constitute an integral part of the technical teaching provided herein in relation to the invention.

BRIEF DESCRIPTION OF THE DRAWINGS

Further aims, characteristics, and advantages of the invention will emerge clearly from the ensuing detailed description, with reference to the annexed drawings, which are provided purely by way of explanatory and non-limiting example and in which:

FIG. 3 is a schematic cross-sectional view according to the line III-III of FIG. 2;

FIG. 4 is a schematic perspective view, partially sectioned, of the sensorized supporting device of FIG. 1;

FIGS. 21 and 22 are schematic representations in front elevation of a piezoelectric transducer of a sensorized supporting base of a supporting device according to first possible embodiments of the invention, in two different configurations of electrical connection;

FIG. 23 is a schematic perspective view aimed at exemplifying the operating principle of a piezoelectric transducer of a sensorized supporting base of a supporting device according to first possible embodiments of the invention;

FIG. 24 is a view similar to that of FIG. 16, corresponding to a sensorized supporting base according to second possible embodiments of the invention;

FIGS. 25 and 26 are schematic representations similar to those of FIGS. 21 and 22, corresponding to a sensorized supporting base of the type shown in FIG. 24;

FIG. 27 is a view similar to that of FIG. 26, aimed at exemplifying the operating principle of a piezoelectric transducer of a sensorized supporting base of the type shown in FIG. 24;

FIGS. 28, 29, and 30 are schematic representations similar to those of FIGS. 25, 26, and 27, corresponding to a sensorized supporting base produced according to third possible embodiments of the invention;

DETAILED DESCRIPTION OF PREFERRED EMBODIMENTS OF THE INVENTION

Figure 1:
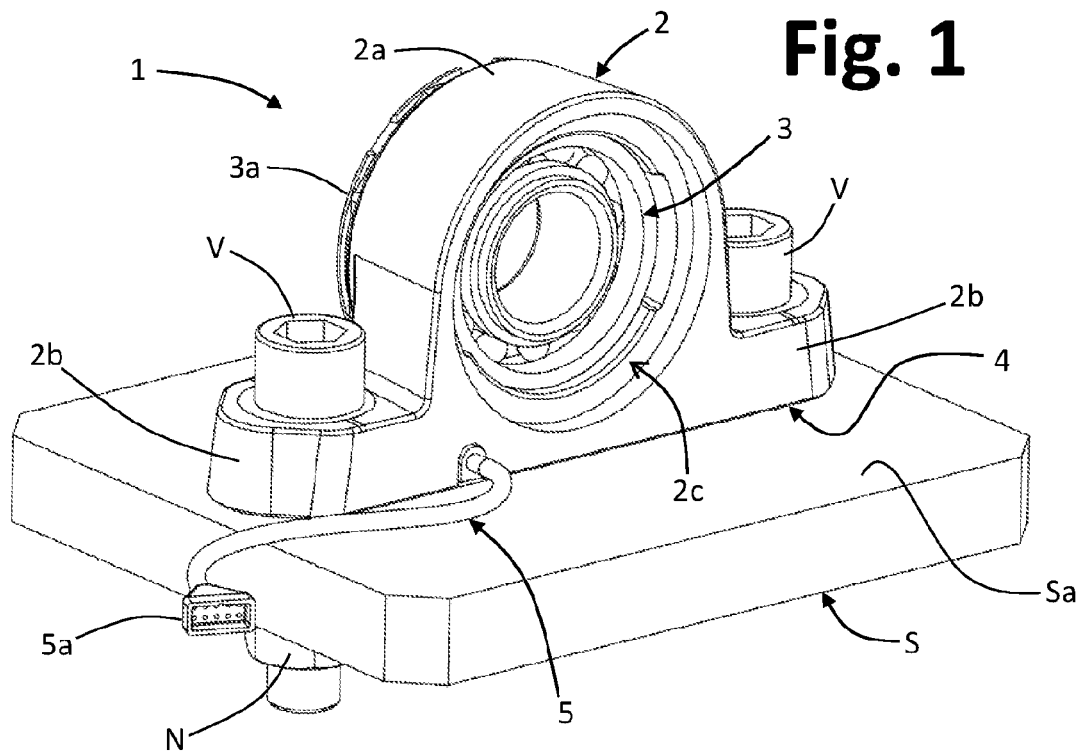
FIG. 1 is a schematic perspective view of a sensorized supporting device according to possible embodiments of the invention, mechanically secured to a generic mounting structure.
Figure 2:
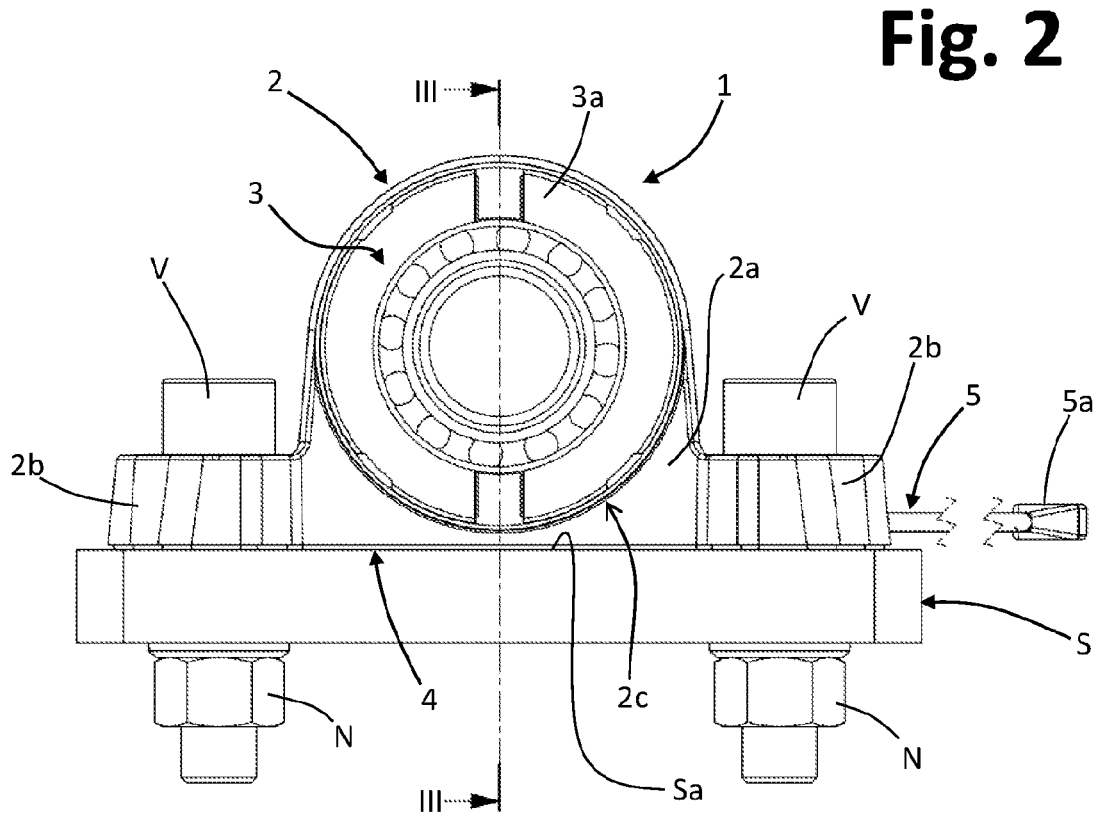
FIG. 2 is a view in elevation of the sensorized supporting device of FIG. 1.
Figure 5:
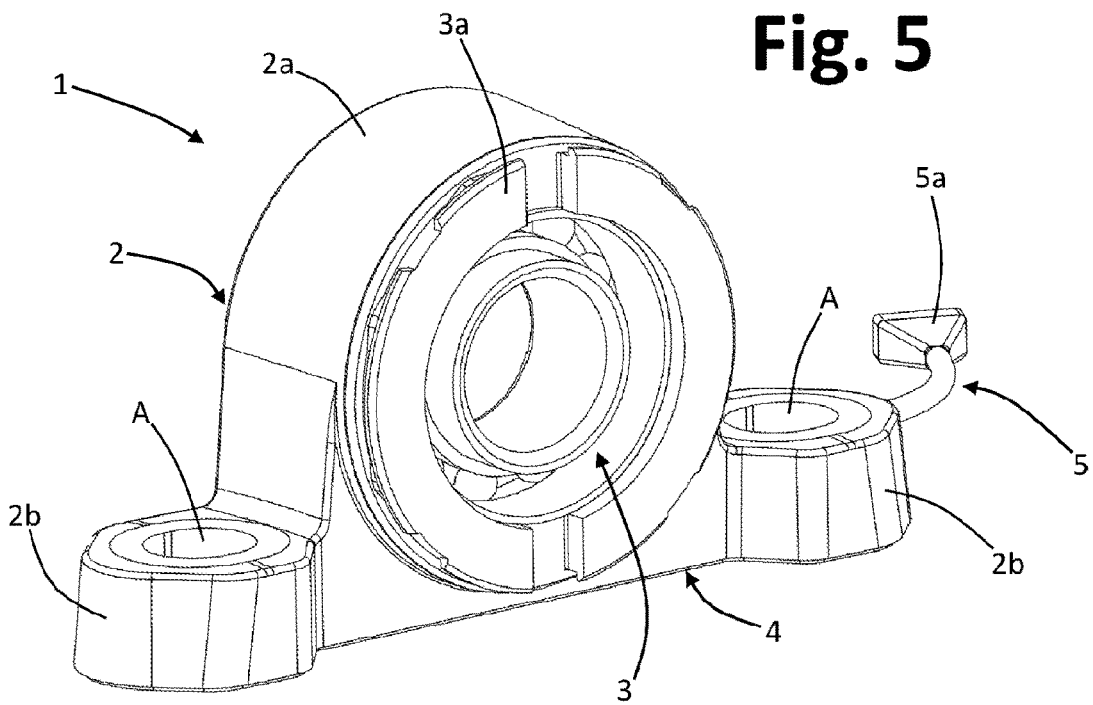
FIGS. 5 and 6 are schematic perspective views from different angles of a sensorized supporting device according to possible embodiments of the invention.
Figure 6:
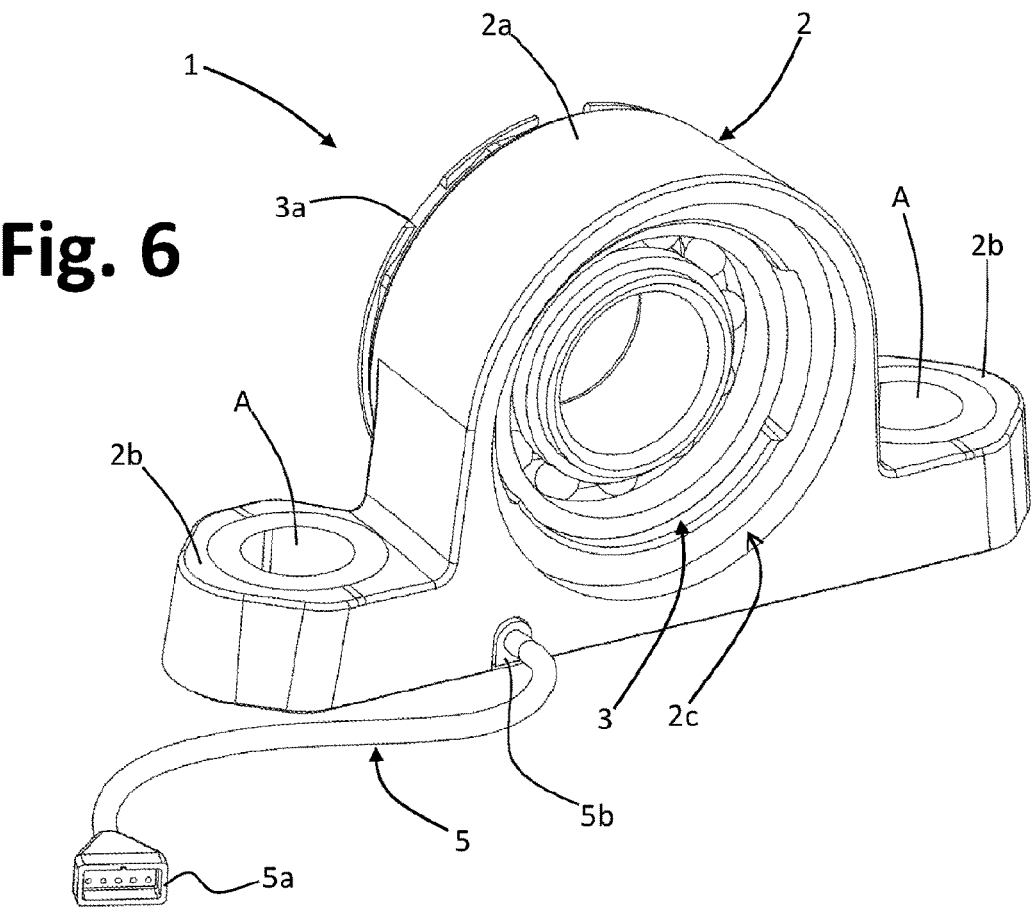

Reference to "an embodiment", "one embodiment", "various embodiments", and the like, in the framework of this description is meant to indicate that at least one particular configuration, structure, or characteristic described in relation to an embodiment is comprised in at least one embodiment. Hence, phrases such as "in an embodiment", "in one embodiment", "in various embodiments", and the like that may be present in various points of this description do not necessarily refer to one and the same embodiment, but may instead refer to different embodiments. Moreover, particular conformations, structures, or characteristics defined in the framework of this description may be combined in any adequate way in one or more embodiments, even different from the ones shown. The reference numbers and spatial references (such as "upper", "lower", "top", "bottom", "front", "back", "vertical", etc.) used herein, in particular with reference to the examples in the figures, are only provided for convenience and hence do not define the sphere of protection or the scope of the embodiments. In the present description and in the attached claims, the generic term "material" is to be understood as comprising also mixtures, compositions, or combinations of a number of different materials. In the present description and in the attached claims, the generic terms "force" and "stress" are to be understood as comprising also vector physical quantities, preferably of a dynamic type, determined by mechanical loads and/or vibrations and/or albeit minimal movements or displacements of at least one part undergoing detection. In the drawings, the same reference numbers are used to designate elements that are similar or technically equivalent to one another.

In FIGS. 1-8, designated as a whole by 1 is a sensorized bearing-supporting device according to possible embodiment of the invention. In FIGS. 1-4, the device 1 is shown in an installed condition, i.e., secured to a generic mounting structure, designated by S, whereas in FIGS. 5-8 the device 1 is shown in isolation.

The device 1 includes a bearing housing or support 2, made, for example, of metal material or polymeric material, or combinations thereof, having a central housing portion 2a and two lateral fixing portions 2b.

Defined in the central portion 2a is a seat 2c for a bearing, designated as a whole by 3, for example comprising an inner ring, an outer ring, and a plurality of rolling elements set in between, with a possible cage or retainer. The structure of the bearings that can be used in combination with the sensorized supporting device 1 may in any case be of any known type and is irrespective of the aims of the invention. The bearing 3 may be secured in the corresponding seat 2c via suitable mounting elements 3a. In any case, also the modalities of mounting of the bearing 3 in the housing or support 2 are irrespective of the invention, it being possible for them to be of any known type. As may be noted also from FIGS. 5-9, the lateral portions 2b of the housing 2 are basically shaped like brackets or eyelets, in particular having a central hole A for respective members for fixing, in corresponding holes, to the mounting structure S; in the non-limiting example, these fixing members, preferably bolts, comprise two screws V with hexagonal hollow head, and respective nuts N.

The sensorized supporting device 1 further comprises a sensorized supporting base 4, which, in the non-limiting example shown, is to be operatively set between the housing 2 and the mounting structure S. The sensorized supporting base 4 may be set only in part between the housing 2 and the mounting structure S. In other embodiments, between the base 4, on one side, and the housing 2 or the structure S, on the other side, interposition of other elements may be envisaged.

The sensorized supporting base 4 is provided with stress-sensor means (i.e., sensor means that are designed to detect mechanical stresses and/or vibrations and/or movements or displacements of the bearing housing 2 with respect to the mounting structure S), described hereinafter, and for this purpose preferably associated thereto is a multipolar cable 5 for carrying electrical signals, preferentially provided at the distal end of which is a connector 5a, for example for connection to an external control system, not represented.

The base 4 is preferably to be secured in a substantially stationary position with respect to the housing 2 in order to detect stresses transferred to the latter. More in general, the base 4 is preferably set at least in part between the housing 2 and the mounting structure S in such a way that its stress-sensor means are able to detect vibrations and/or relative movements or displacements between the bearing housing 2 and the mounting structure S, or else relative displacements between the base 4 and the bearing housing 2 or the mounting structure S.

Figure 7:
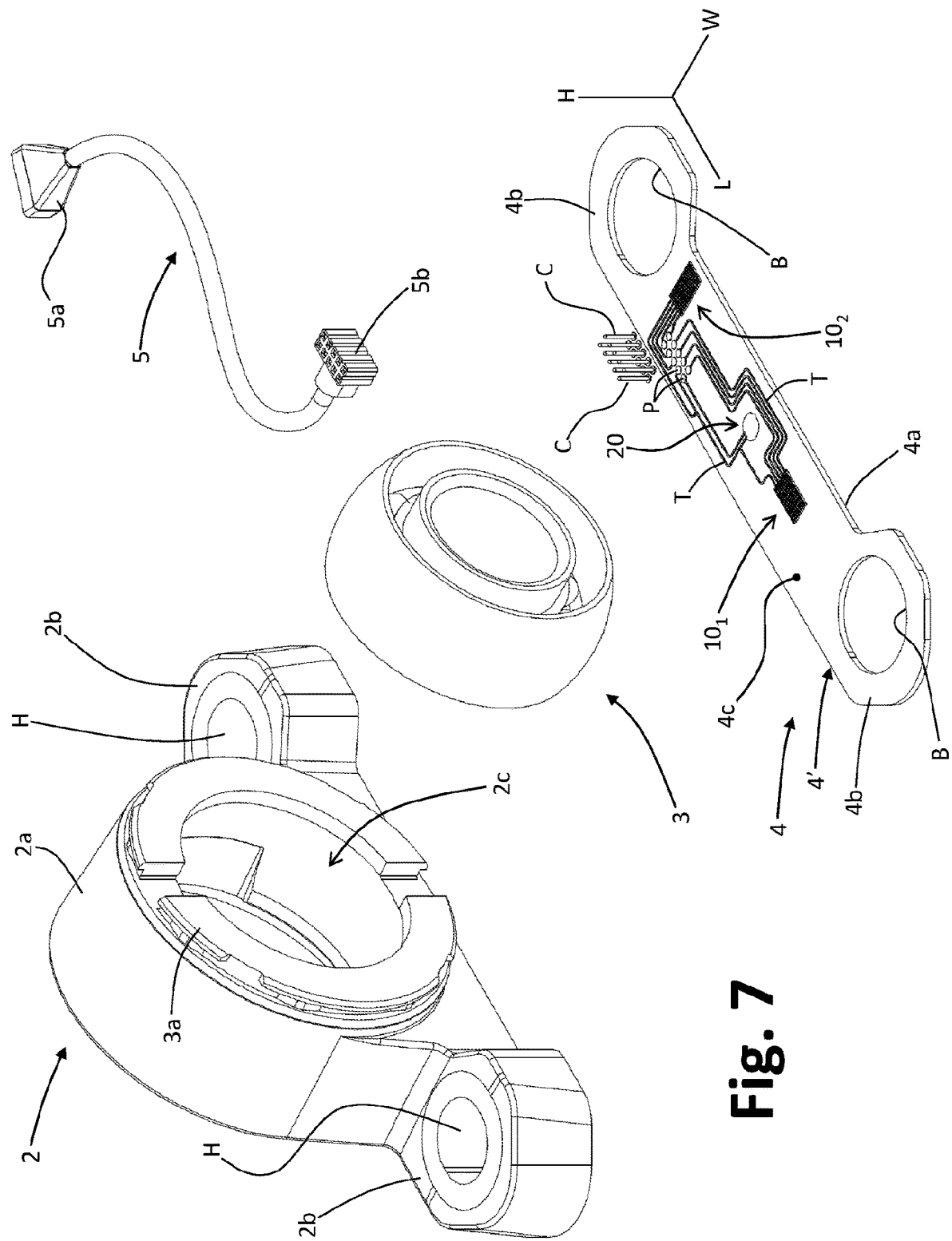
FIG. 7 is an exploded schematic view of the sensorized supporting device of FIGS. 5-6.

In various embodiments, the base 4 has a central region 4a, present in which are the corresponding stress-sensor means, such as the ones designated by $10_1$, $10_2$, and 20 in FIG. 7, as well as corresponding electrical-connection tracks T. As will be seen, according to the invention, the aforesaid stress-sensor means associated to the base 4 comprise at least one piezoelectric transducer, in particular of the type designed to generate a potential difference or voltage and/or an electric current in response to stresses and/or mechanical loads and/or vibrations, such as variations of the force or stress that acts on the above sensor means or transducer.

In the example illustrated, the conductive connection tracks T terminate in pads P, electrically associated to which are respective connection terminals C, these terminals C being configured for coupling with a connector 5b provided at the proximal end of the cable 5.

Figure 9:
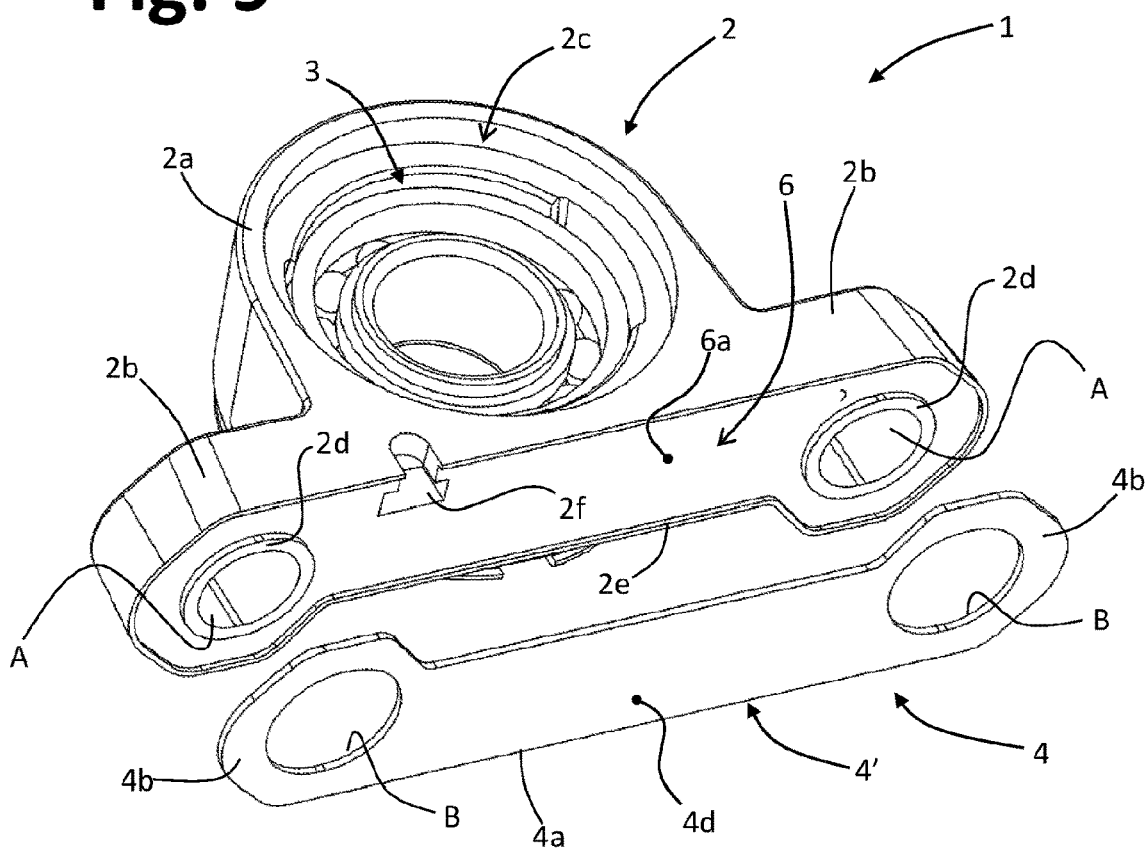
FIG. 9 is an exploded schematic perspective view of a sensorized supporting device according to possible embodiments of the invention.

In various embodiments, the body 4' of the base 4 has two opposite end regions, configured for positioning with respect to the lower side of the support 2. In the example illustrated, the above two end regions, designated by 4b, have positioning elements represented by respective through openings B, in which corresponding parts in relief of the lower face of the housing 2 are to engage. These parts in relief, designated by 2d, for example, in FIG. 9, are defined at the lateral portions 2b of the housing 2 and axially penetrate into corresponding portions of the holes A; in the example, the passages B and the parts in relief 2d have a substantially complementary circular profile, but other geometrical shapes are obviously possible (for example, holes A and passages B with quadrangular or polygonal profile). In addition or as an alternative to the passages B and/or to the parts in relief 2d, the body 4' and the housing 2 could include positioning elements of some other type.

From FIG. 9 it may moreover be noted how, in various preferential embodiments, the lower face of the housing 2 presents a perimetral edge 2e projecting downwards, having a profile preferably substantially complementary to the peripheral profile of the supporting base 4. The lower edge 2e of the housing delimits a seat, designated by 6 in FIG. 9, at least partially housed within which is the base 4, with at least one detection surface of the latter—designated by 4c, for example, in FIGS. 7 and 8—that is at least locally defined by the aforesaid stress-sensor means. In various embodiments, the detection surface 4c is at least locally in contact with the lower surface 6a (FIG. 9) of the aforesaid seat 6, for example at the part or parts of its surface 4c defined by the stress-sensor means. In other embodiments, set between the detection surface 4c and the lower surface 6a of the seat 6 is at least one further element or a material (for example, a layer of resin), in any case designed to transmit the mechanical stresses from the housing 2 to the base 4, or to the corresponding sensor means. Preferentially, and as may be noted, for example, from FIGS. 3 and 4, the depth of the seat 6 (or the height of the edge 2e) is less than the thickness of the supporting base 4 so that the lower surface 6a of the seat 6 is effectively in contact with the detection surface 4c of the base 4, at least at the stress-sensor means.

In various embodiments, in the assembled condition of the device 1, a surface of the base 4 opposite to the detection surface 4c, such as the surface designated by 4d in FIG. 9, rests (either directly or with interposition of some other possible element, for example an adhesive or a lower lid) on a corresponding (upper) surface Sa of the mounting structure S, whereas resting on the detection surface 4c of the base 4 (either directly or with interposition of some other element, for example an adhesive or a resin) is the lower surface 6a of the seat 6 of the housing.

Once again in FIG. 9, it may be noted how, in various embodiments, the bearing housing 2 defines a seat 2f designed for receiving at least partially the connector 5b or an element for withholding the cable 5, the seat 2f being open both at a lateral surface of the housing 2 and at the lower surface 6a of the seat 6.

Figure 10:
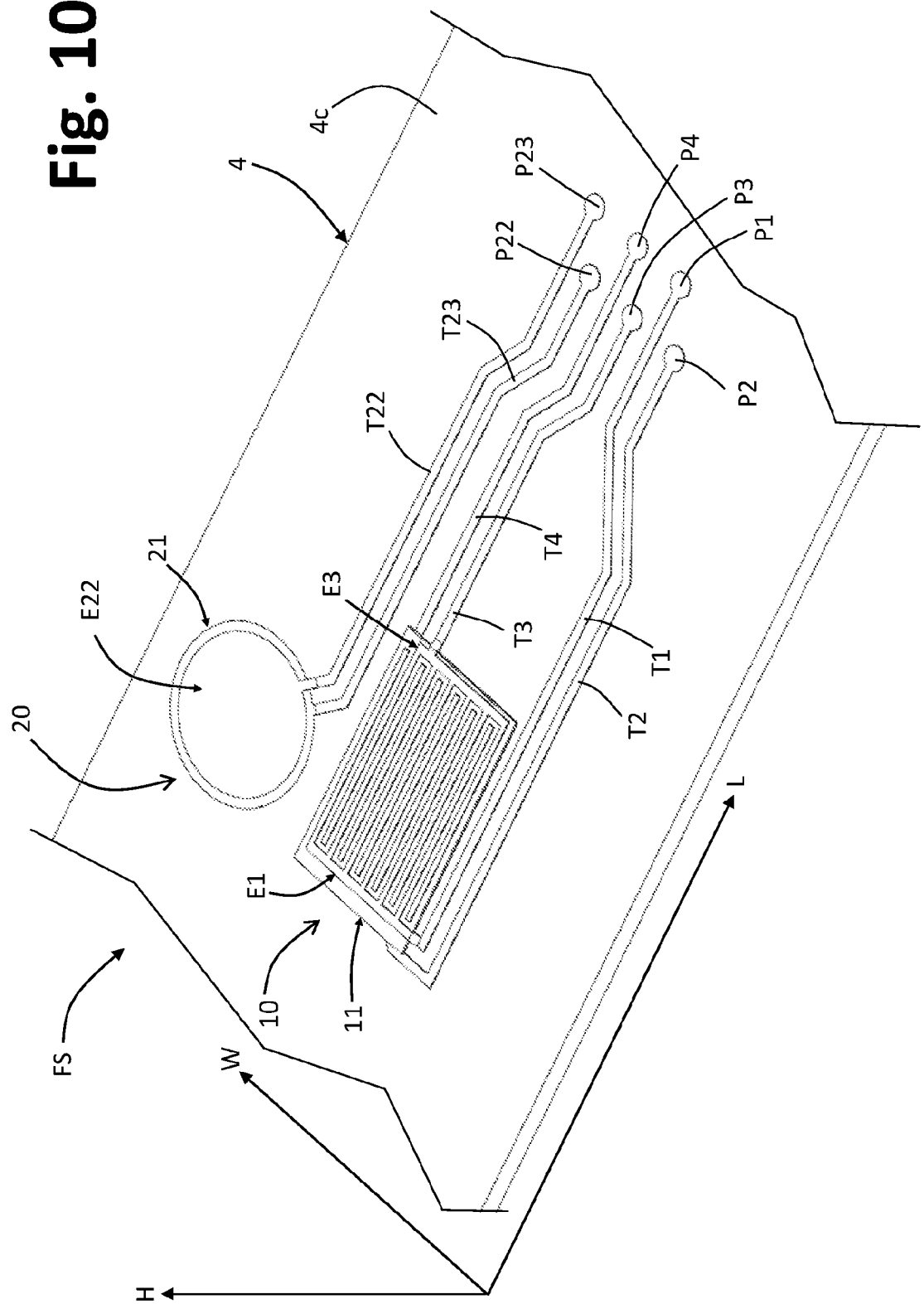
FIG. 10 is a partial and schematic perspective view of a sensorized supporting base of a supporting device according to possible embodiments of the invention.

FIG. 10 illustrates, merely by way of example, a central portion 4a of a sensorized supporting base 4 having an arrangement of the corresponding stress-sensor means 10 and 20 different from the one visible in FIG. 7, but implemented according to the same concepts.

In various embodiments, the base 4 essentially provides a substrate, preferably but not necessarily with a substantially planar shape, having a length, a width, and a thickness that extend in the directions designated by L, W, and H, respectively, in FIG. 10. These directions L, W, and H will also be referred to hereinafter, respectively, as longitudinal direction, transverse direction, and axial direction, with reference to the plane of the base 4. The base 4 may have indicatively a thickness comprised between 0.5 and 4 mm.

Figure 8:
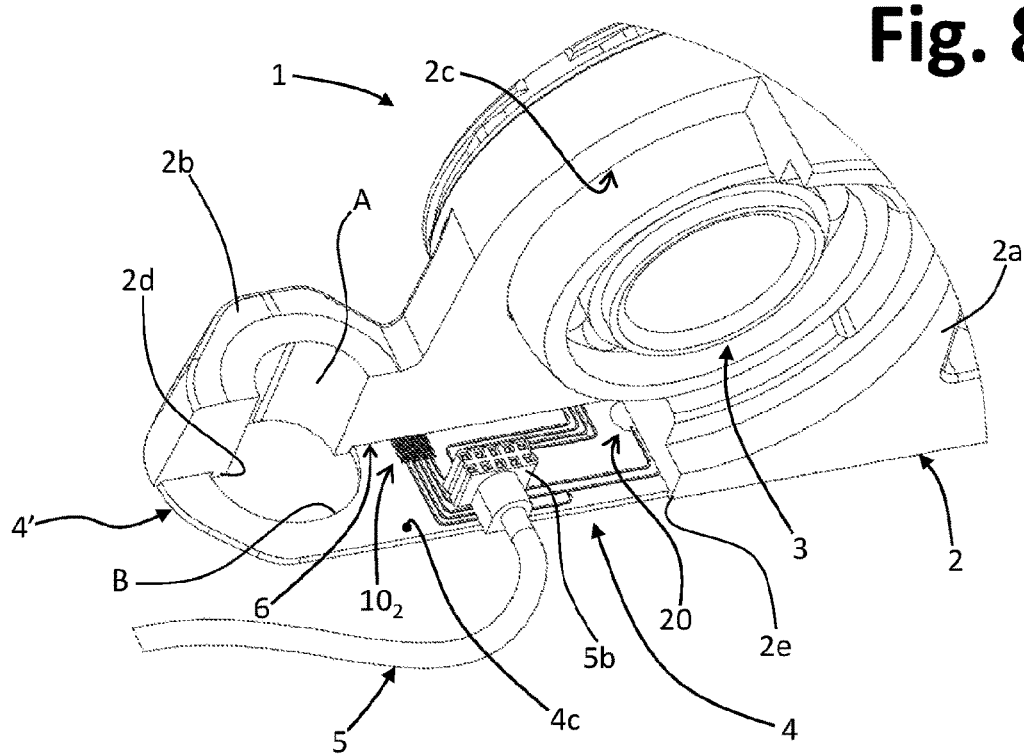
FIG. 8 is a schematic perspective view, partially sectioned, of a portion of the sensorized supporting device of FIGS. 5-6.

The base 4 comprises a body, designated by 4' only in FIGS. 7-9, which may be made of electrically insulating material (for example, a ceramic material) or may be made of an electrically conductive material coated at least in part with an electrically insulating material, for example, a metal or a metal alloy (e.g., steel), and coated with a layer of dielectric material (for example, a polymer or a metal oxide or mixtures of oxides), or else may be made of a ceramic material or a ceramic oxide or mixtures of ceramic oxides (for example, alumina or mixtures of alumina and zirconia). Not excluded, however, from the scope of the invention is the use of other materials that are suitable for the purpose.

At a major face or surface 4c of the body 4' of the base 4 is at least one first piezoelectric transducer, which is in particular configured for detecting shear stresses, i.e., stresses that have at least one component in the longitudinal direction L and/or in the transverse direction W. In various embodiments, the aforesaid transducer is designed to be mechanically associated to an element of which a displacement or a deformation is to be detected—i.e., the housing 2—and is able to generate an electrical signal representing a shear stress determined by such a displacement or deformation. In various embodiments, preferably at the same sensorized face of the base 4, there may be provided at least one second piezoelectric transducer, substantially of the same type as the first transducer, but configured for detecting shear stresses in a direction different from that of the aforesaid first transducer. Such a case is, in fact, exemplified in FIG. 7, where the base 4 is provided with a first piezoelectric transducer $10_1$ specially configured for detecting shear stresses having a component in the longitudinal direction L, and a second piezoelectric transducer $10_2$ specially configured for detecting shear stresses having a component in the transverse direction W. In various embodiments, preferably at the same sensorized face of the base 4, there may be provided at least one further transducer, which is preferably also of a piezoelectric type, in particular configured for detecting normal stresses, i.e., stresses that have at least one component in the axial direction H: such a transducer is designated by 20 in FIGS. 7 and 10.

As has been mentioned, and as will emerge more clearly hereinafter, in various embodiments, to the upper part of at least one transducer 10, i.e., its part opposite to the base 4, there is to be associated or mechanically connected the housing 2, which—following upon loads exerted on the bearing 3 or generated thereby—is able to perform movements or undergo deformations relative to the mounting structure S and to the base 4: hence, in other words the bearing 3 transmits to the support 2 a force having at least one component in the directions L and/or W and/or H, of which it is desired to measure the magnitude via one or more piezoelectric transducers.

Given that the lower part of the transducer 10 is in a fixed position relative to the base 4 (which is in turn in a stationary position) and the upper part of the transducer 10 is associated or fixed (for example, glued) to the housing 2, a force applied on the latter in the direction W and/or in the direction L causes a stress in the transducer 10, which—by the piezoelectric effect—generates across corresponding electrodes an electrical potential difference proportional to the magnitude of the shear stress induced. In this way, it is possible to have available information corresponding to the direction of the load imparted on the housing 2 by the bearing 3.

The housing 2 may be associated also to the upper part of a piezoelectric transducer 20, when to the housing an axial force can be applied having at least one component in the direction H: this axial force hence induces a corresponding stress in the transducer 20, which, by the piezoelectric effect, generates across corresponding electrodes a potential difference representing the magnitude of the normal stress induced.

The housing 2 does not necessarily have to be fixed to the transducer 20, but may be simply set on top of it. On the other hand, it is not even strictly necessary for the housing to be fixed to the transducer 10, if the two parts in question are in any case set resting on top of one another or adherent to one another or slotted into one another, or in any case associated to one another in such a way as to guarantee that a movement or a deformation of the housing 2 in the direction L and/or W will induce a corresponding stress in the transducer 10. However, according to particularly advantageous embodiments of the invention, laid between the detection surface 4c of the base 4 and the bottom surface 6a of the housing, in particular at least at the transducers 10 and/or 20, is a thin layer of resin, or more in general a material (for example, adhesive material) designed to constrain together the parts in question and transmit to a transducer 10 and/or 20 the albeit minimal movements in the various directions of the housing 2, for example in the axial direction H or in the lateral direction L and/or W. The aforesaid layer is exemplified in FIG. 3, where it is designated by 7, and may have a thickness indicatively comprised between 100 nm and 2 mm, preferably between 10 and 200 μm.

The base 4 on which the transducers 10 and/or 20 are defined, for example screen-printed, is then resin-coated or provided with a polymer or an adhesive, preferably to be fixed with respect to the housing 2: the resin 7 transmits mechanically to the transducers the stresses to which the housing itself is subjected. Even though the bearing housing 2 is in general designed for being rigid and undergoing as little deformation as possible, it will in any case be subject to an albeit minimal deformation if it is subjected to stress: the extreme sensitivity of the piezoelectric transducers used, which are able to detect nanometric movements, also enables detection of these minor deformations.

In various embodiments, the transducer, or each transducer, comprises at least one element or layer of piezoelectric material (referred to hereinafter, for simplicity, as "piezoelectric layer") and at least two electrodes, each of which is associated to a major face of the piezoelectric layer. Preferentially, the electrodes are defined by tracks made of electrically conductive material (referred to hereinafter, for simplicity, as "conductive tracks"), with these tracks that may possibly define—at their end opposite to the corresponding electrode—terminal connection portions, for example in the form of pads. With reference, for example, to FIG. 10, where the piezoelectric layers of the transducer $10_1$ and of the transducer 20 are designated by 11 and 21, respectively, the letters "T", "E", and "P" (followed by corresponding reference numbers) identify the aforesaid conductive tracks, some of the corresponding electrodes, and the corresponding terminal portions or pads, respectively. It should be noted that the electrodes E and the tracks T do not necessarily have to be formed integrally: for example, it is possible to form the piezoelectric layer 11 or 21 as a stand-alone body, with a plate or laminar shape, then form the electrodes E on the opposite major faces of the corresponding piezoelectric layer 11 or 21, then form the tracks T with the corresponding pads P on the sensorized face 4a of the base 4, and finally secure the layer 11 or 21 carrying the electrodes E on the face 4a of the base 4, providing the necessary connections between the electrodes E and the corresponding tracks T. This solution is similar to mounting of electronic components of the SMD type, where the component provided with electrodes is positioned on an electrical circuit such as a PCB or hybrid circuit and subsequently soldered.

Preferably, the piezoelectric layer 11 and/or 21, the tracks T, and the electrodes E are substantially planar and lie substantially parallel to one another and to the surface of the corresponding face of the body 4'.

In various embodiments, the transducer 10 and/or 20, or its piezoelectric layer 11 and/or 21, is obtained via deposition of material on the base 4 and/or at least in part on the lower electrodes, for example via screen printing or spin coating.

Preferentially, also the electrodes E, or the conductive tracks T, are formed using deposition processes, for example with screen-printing techniques, or sputtering techniques, or techniques of thermal evaporation, or by dispensing or, more in general, with any known technique designed for deposition of electrically conductive materials on a corresponding substrate.

In various preferential embodiments, the entire transducer 10 and/or 20 is obtained via deposition of successive layers of different materials on the base 4, i.e., first by depositing the electrically conductive parts that are to be set at least in part on the lower face of the layer 11 and/or 21, then depositing the piezoelectric layer 11 and/or 21, and finally depositing the electrically conductive parts that are to be at least in part at the upper face of the layer 11 and/or 21.

Deposition in superimposed layers is preferentially obtained using screen-printing techniques, in which case the piezoelectric layer 11 and/or 21 may have a thickness of between 20 and 300 μm, preferably approximately 100 μm, with the electrodes E and the tracks T having, instead, a thickness of between 8 and 25 μm, preferably approximately 15 μm. Alternatively, the piezoelectric layer (and the electrodes E and/or the tracks T) may be deposited using thin-film techniques (such as sol-gel, sputtering or CVD—Chemical Vapour Deposition), in which case the layer may have a thickness of between 50 and 2000 nm, preferably between 500 and 800 nm (the tracks/electrodes may have a thickness of between 50 and 200 nm, preferably between 80 and 120 nm, and may be deposited by sputtering, thermal evaporation, or screen printing with metalorganic inks).

The layer 11, or each layer 11 and/or 21, may be deposited using pastes with piezoelectric ceramic (piezoceramic) base, whereas the electrodes E may be obtained using pastes with a metal base, preferably of noble metals (for example, pastes with a base of platinum, or silver, or silver-palladium, or silver-platinum).

The piezoelectric layer, or each piezoelectric layer, may be obtained also with techniques different from those exemplified above and/or not necessarily via deposition or growth of material on a substrate: for example, a piezoelectric layer could be configured as a body made of piezoelectric ceramic obtained by compression of powders and their subsequent sintering, on the two major faces of which the electrodes E are next deposited or applied, and are then connected to the corresponding tracks T provided, instead, on the corresponding face of the base 4. Also in this case, as described previously, the process is similar to a mounting of the SMD type of the piezoelectric-ceramic element on a PCB or on a hybrid circuit.

Figure 11:
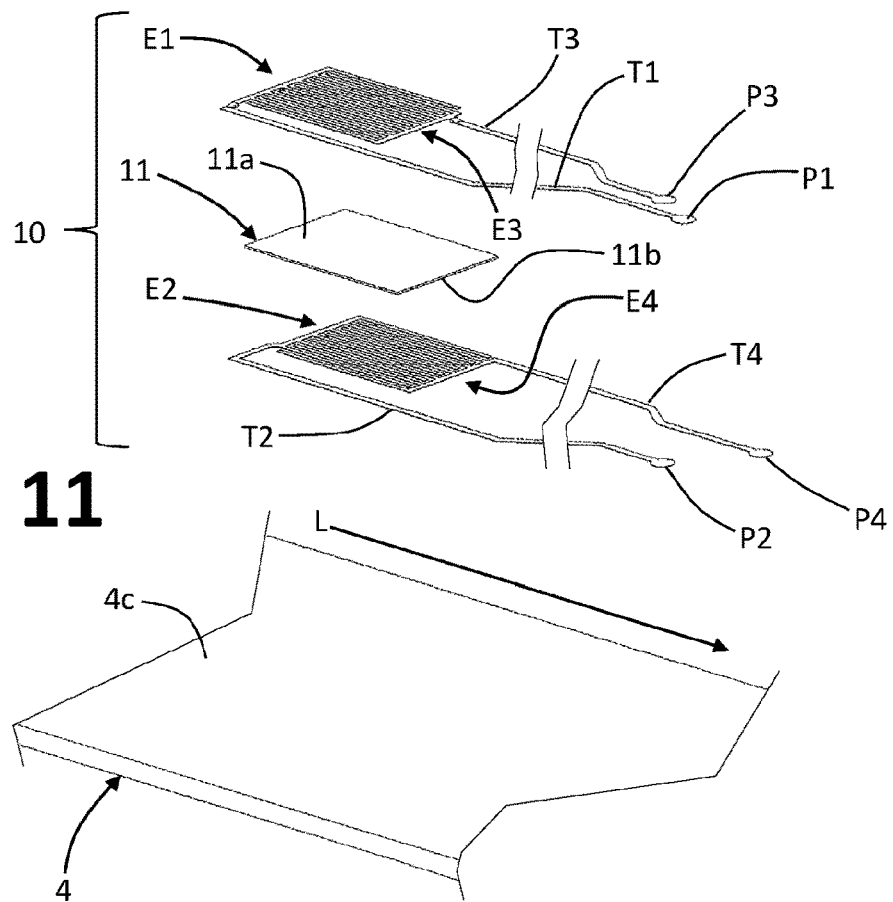
FIG. 11 is an exploded schematic view of a first piezoelectric transducer of a sensorized supporting base of a supporting device according to possible embodiments of the invention.

In FIG. 11, a transducer 10 is represented schematically in exploded view. As may be noted, in various embodiments, the piezoelectric layer 11 extends in the longitudinal direction L and has two opposite major faces 11a and 11b, on which there are at least one first electrode E1 and one second electrode E2, respectively. Preferentially associated to each electrode E1 and E2 is a corresponding conductive track T1 and T2, deposited or in any case obtained at least in part on the face 8a of the body 8', which defines a respective connection pad P1 and P2.

Figure 12:
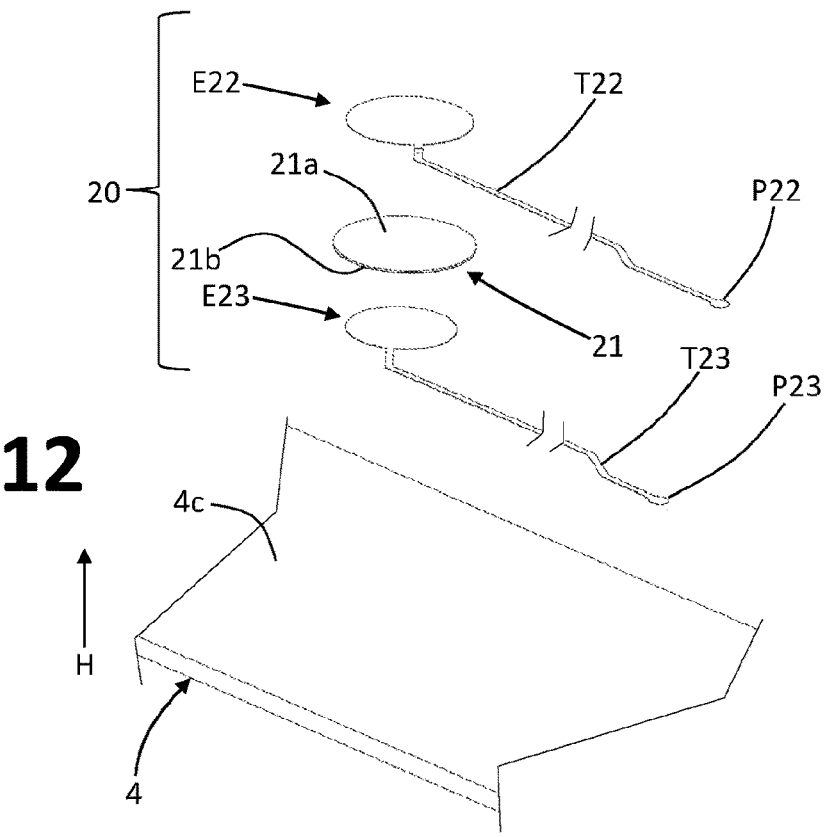
FIG. 12 is an exploded schematic view of a second piezoelectric transducer of a sensorized supporting base of a supporting device according to possible embodiments of the invention.

An embodiment of this sort is shown in FIG. 12 for a transducer 20, where the piezoelectric layer 21 has a circular shape, and associated to its opposite major faces 21a and 21b are respective electrodes E22 and E23, which are also preferably circular.

Also associated to each electrode E22 and E23 is a corresponding conductive track T22 and T23, provided at least in part on the face 4c of the base 4, which defines a respective connection pad P22 and P23. It should be noted that the circular shape of the piezoelectric layer 21 and of the corresponding electrodes E22, E23, albeit preferable, is not imperative.

As has been said, assuming a deposition in stacked layers of the type exemplified above for the transducers 10 and 20 of FIG. 10, for example by screen printing, on the face 4c of the base 4 first the tracks T2 and T23 that define the electrodes E1 and E23 with the corresponding pads P2 and P23 are deposited, next on the face 8a and on the parts of the tracks T2 and T23 that define the electrodes E2 and E23 the piezoelectric layers 11 and 21 are deposited, and finally the tracks T1 and T22 are deposited, with their part (comprising the pads P1 and P22) that extends on the face 4c of the base 4, and with their part defining the electrodes E1 and E22 that extends, instead, on the upper faces of the piezoelectric layers 11 and 21, respectively.

As has been said, in any case, the electrodes may be configured as distinct parts formed on the opposite major faces of layers 11 and/or 21 previously obtained by sintering or in some other way, and then be connected electrically during assembly of the transducers 10 and 20 on the base 4, on which the tracks T1, T2 and T22, T23 are, instead, obtained.

Irrespective of how the electrodes E1 and E2 are obtained, they are preferably comb-like electrodes, namely, electrodes each having at least a plurality of portions, or teeth, or fingers, which extend on the two opposite major faces 11a and 11b of the piezoelectric layer 11, respectively, in a direction of extension of the latter, here the longitudinal direction L.

According to a preferential aspect of the invention, and with reference in particular to FIG. 11, a piezoelectric transducer 10 comprises at least one third electrode E3 and at least one fourth electrode E4, which are also preferably comb-like electrodes, or in any case each have a plurality of fingers that extend in the longitudinal direction L on the two opposite major faces 11a and 11b of the piezoelectric layer 11, respectively. Once again according to the aforesaid preferential aspect of the invention, the fingers of the third electrode E3 are in a configuration interdigitated or alternating with the fingers of the first electrode E1, and the fingers of the fourth electrode E4 are in a configuration interdigitated or alternating with the fingers F2 of the second electrode E2.

The electrodes E3 and E4 are preferentially obtained using the same technique as the one used for forming the electrodes E1 and E2, and in the same production steps. Consequently, with reference once again to the aforementioned example of deposition in superimposed layers via the screen-printing technique, the track T4 with the electrode E4 will be formed in the same deposition step as that in which the track T2 with the electrode E2 on the base 4 is obtained, whereas the track T3 with the electrode E3 will be formed in the same deposition step as that in which the track T1 with the electrode E1, in part on the piezoelectric layer 11 and in part on the base 4, is obtained.

Figure 13:
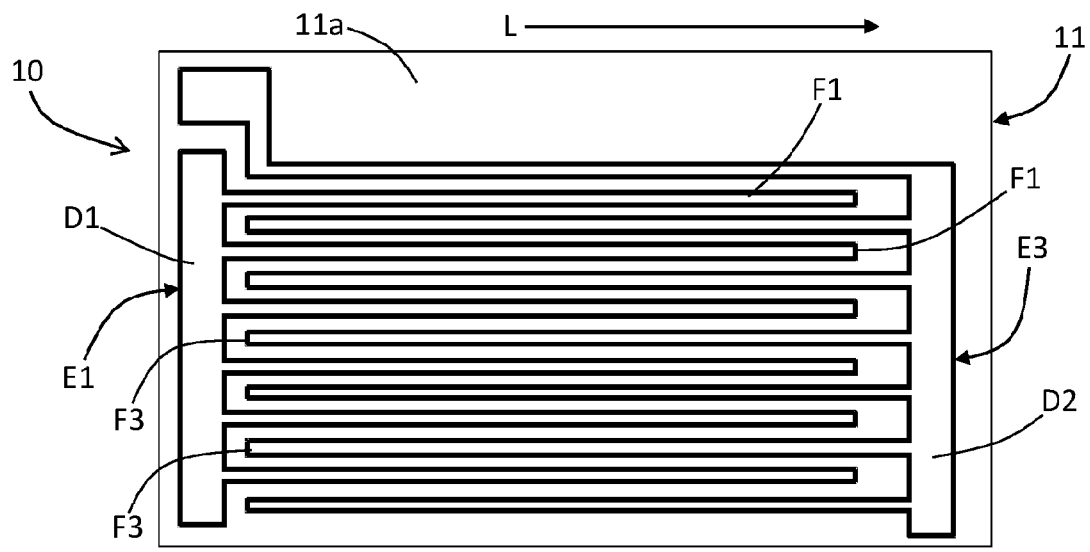
FIGS. 13 and 14 are schematic representations in top plan view and in plan view from beneath, respectively, of a piezoelectric transducer of the type shown in FIG. 11.
Figure 14:
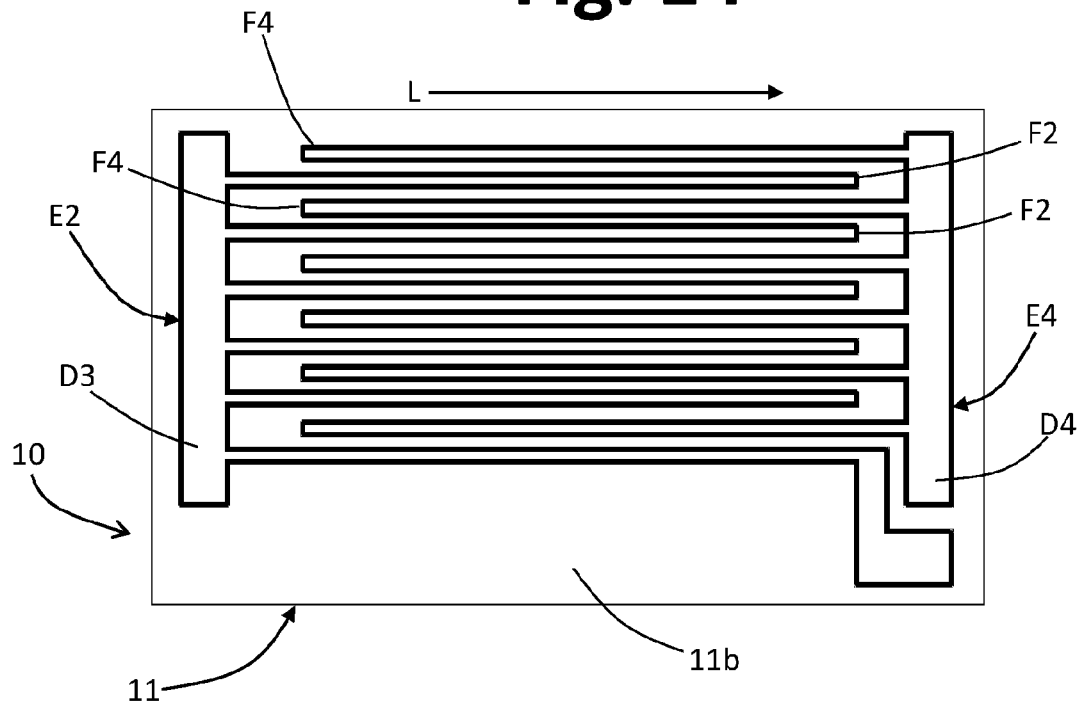

FIGS. 13 and 14 exemplify schematically possible geometries of the electrodes E1 and E3 at the upper face 11a of the layer 11 (FIG. 13), and of the electrodes E2 and E4 at the lower face 11b of the layer 11 (FIG. 14). As may be appreciated, in the non-limiting example, the above electrodes E1-E4 are comb-like electrodes, and hence comprise a series of portions or teeth or fingers that preferably extend substantially parallel to one another, here in the longitudinal direction L of the layer 11, and/or preferably equidistant (i.e., at a substantially constant distance apart from one another), starting from respective collector or distribution portions.

With reference, for example, to FIGS. 13 and 14, the letters "D" and "F", followed by the number identifying the corresponding electrode, denote, precisely, the aforesaid distribution portions of the electrodes E, as well as the corresponding fingers, respectively. As has been said, the fingers F of the electrodes E that are located on one and the same face of the layer 11 are interdigitated. In the preferential configuration, the fingers F of each comb-like electrode E are substantially rectilinear, but this—albeit preferable—does not constitute an essential characteristic, it being possible for the fingers to have, for example, also a different development.

In the example, also the distribution portions D of two electrodes E that are located on one and the same face of the layer 11 are substantially parallel to one another, but neither is this characteristic to be deemed essential.

Figure 15:
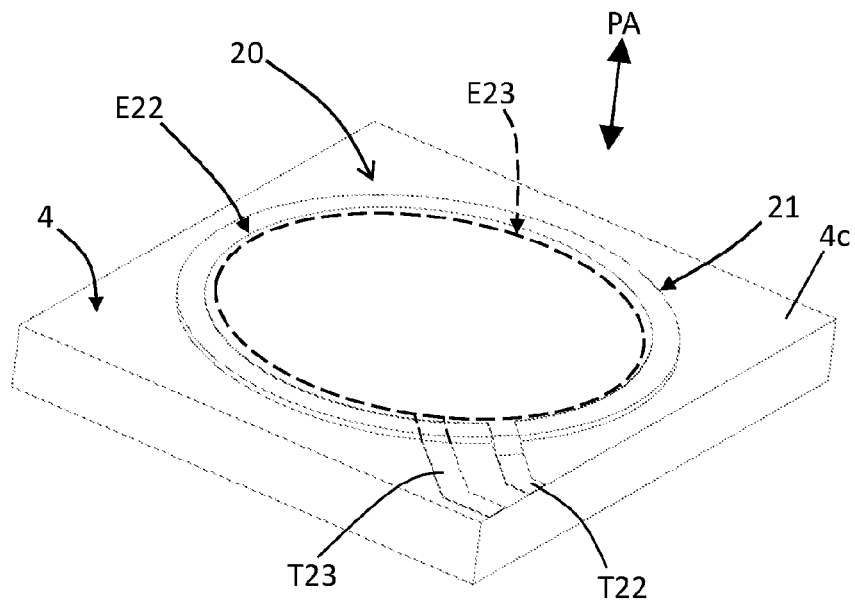
FIG. 15 is a schematic perspective view of a portion of a sensorized supporting base of a supporting device according to possible embodiments of the invention.

Visible in FIG. 15 is a portion of a base 4 at which a transducer 20 is located, that, as has been said, comprises an upper electrode E22 and a lower electrode E23, set between which is the corresponding piezoelectric layer 21. Preferentially, when the transducer 20 is obtained by deposition of successive layers on the base 4, it is preferable for the layer 21 to have perimetral dimensions (here the circumference) greater than those of the electrodes E22 and E23, which are preferably substantially the same as one another: the larger perimetral size of the layer 21 as compared to the electrodes E22 and E23 simplifies stacking of the various layers of material during the deposition process, for example via screen printing. The transducer 20 basically operates as pressure sensor; namely, the layer 21 generates a voltage (or electrical potential difference) when the layer 21 is compressed, i.e., when the upper electrode E22 is pushed towards the lower electrode E23, i.e., when the bearing housing 2 is pushed on the sensorized supporting base 4.

Figure 16:
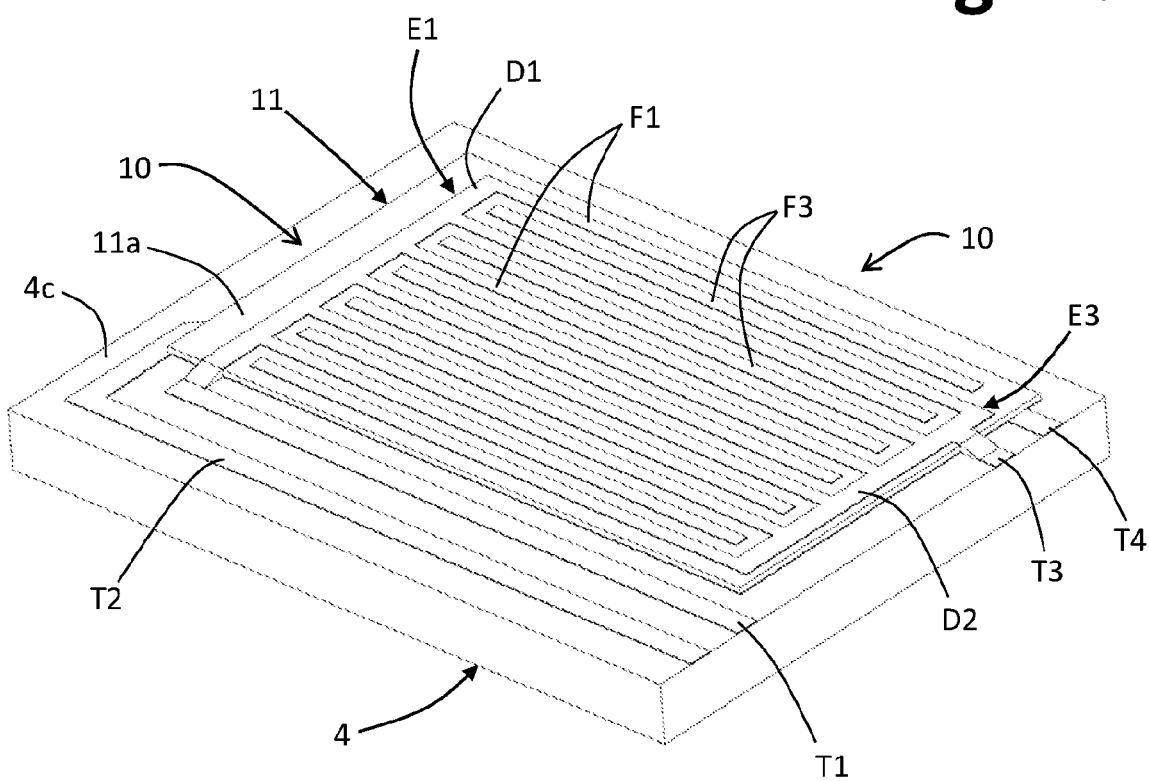
FIG. 16 is a schematic perspective view of a portion of a sensorized supporting base of a supporting device according to possible embodiments of the invention.
Figure 17:
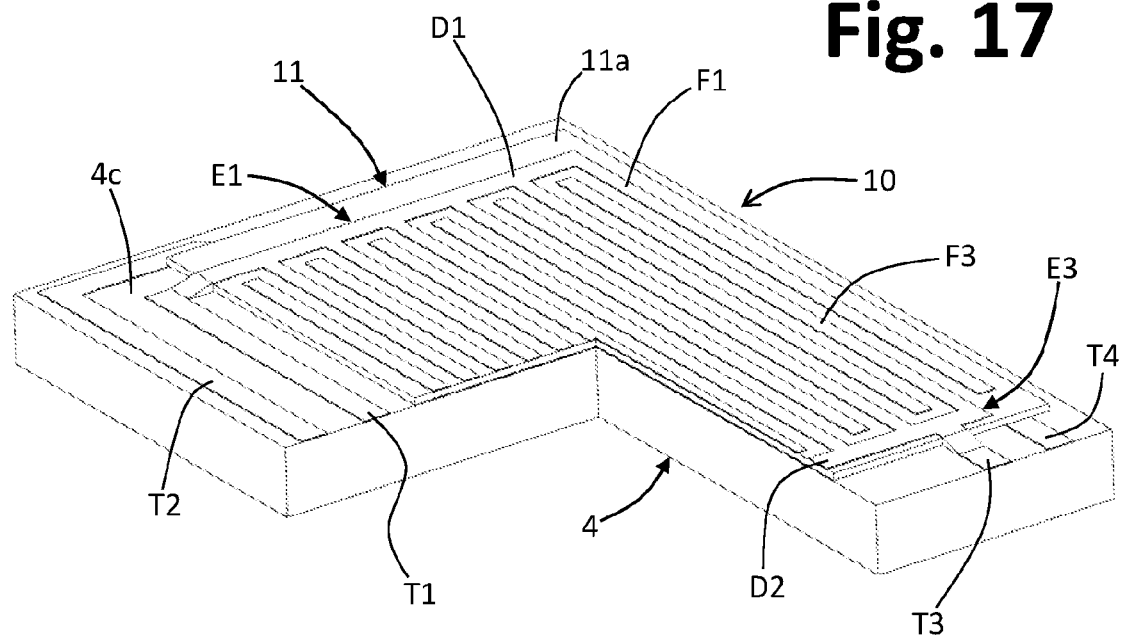
FIG. 17 is a first sectioned perspective view of the portion of sensorized supporting base of FIG. 16.
Figure 18:
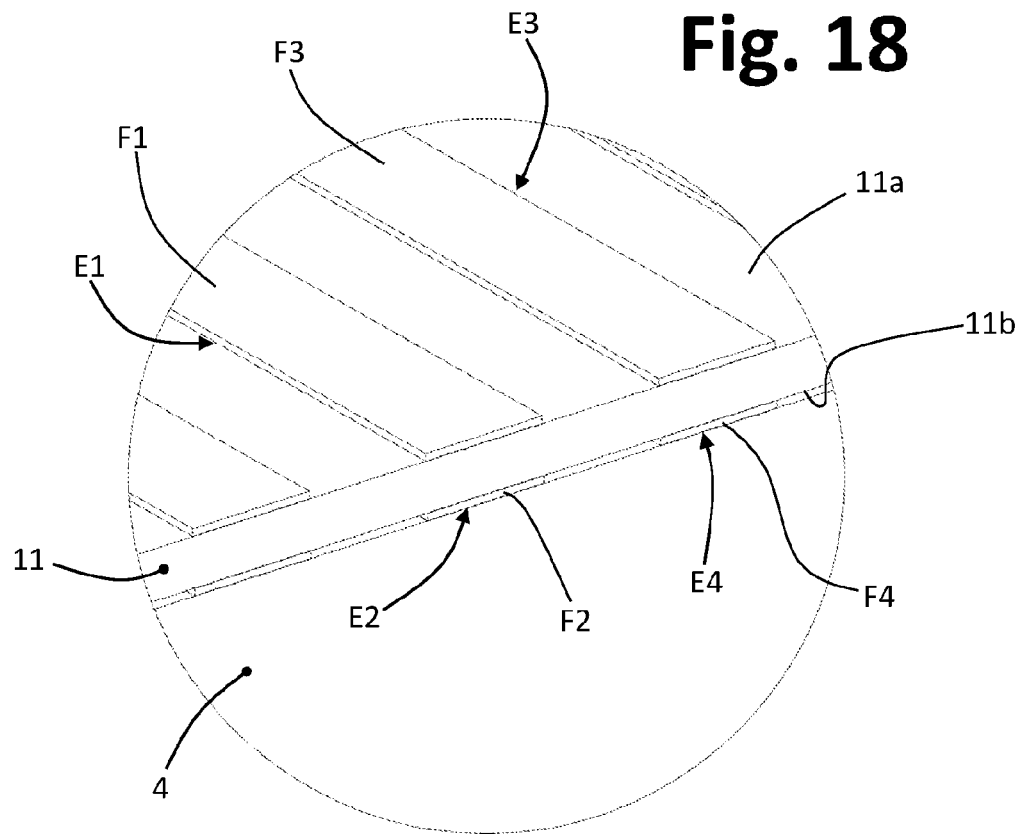
FIG. 18 is a detail at a larger scale of FIG. 17.
Figure 19:
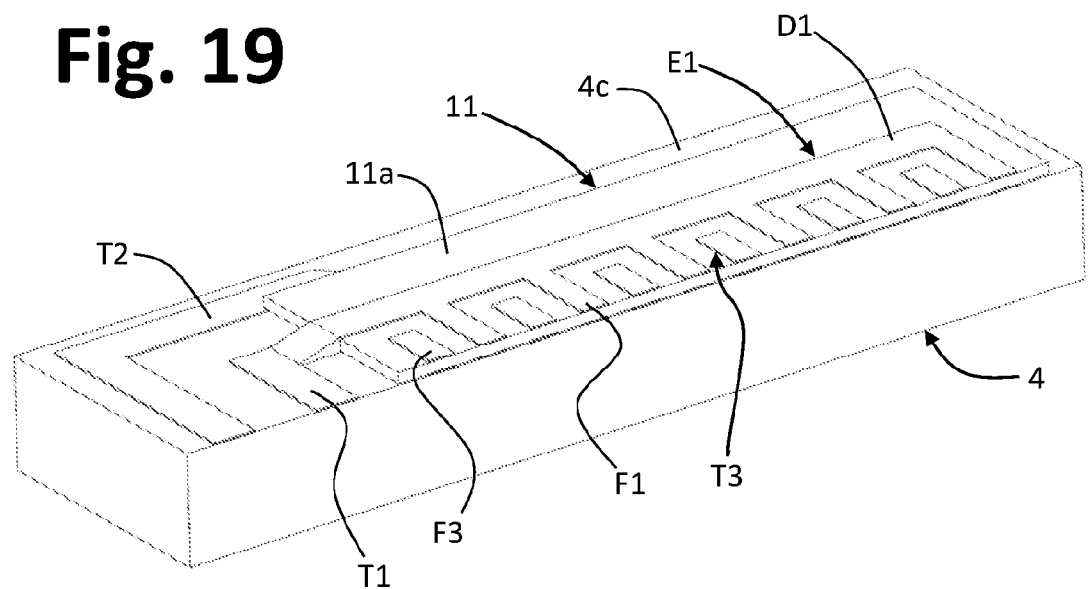
FIG. 19 is a second sectioned perspective view of the portion of sensorized supporting base of FIG. 16.
Figure 20:
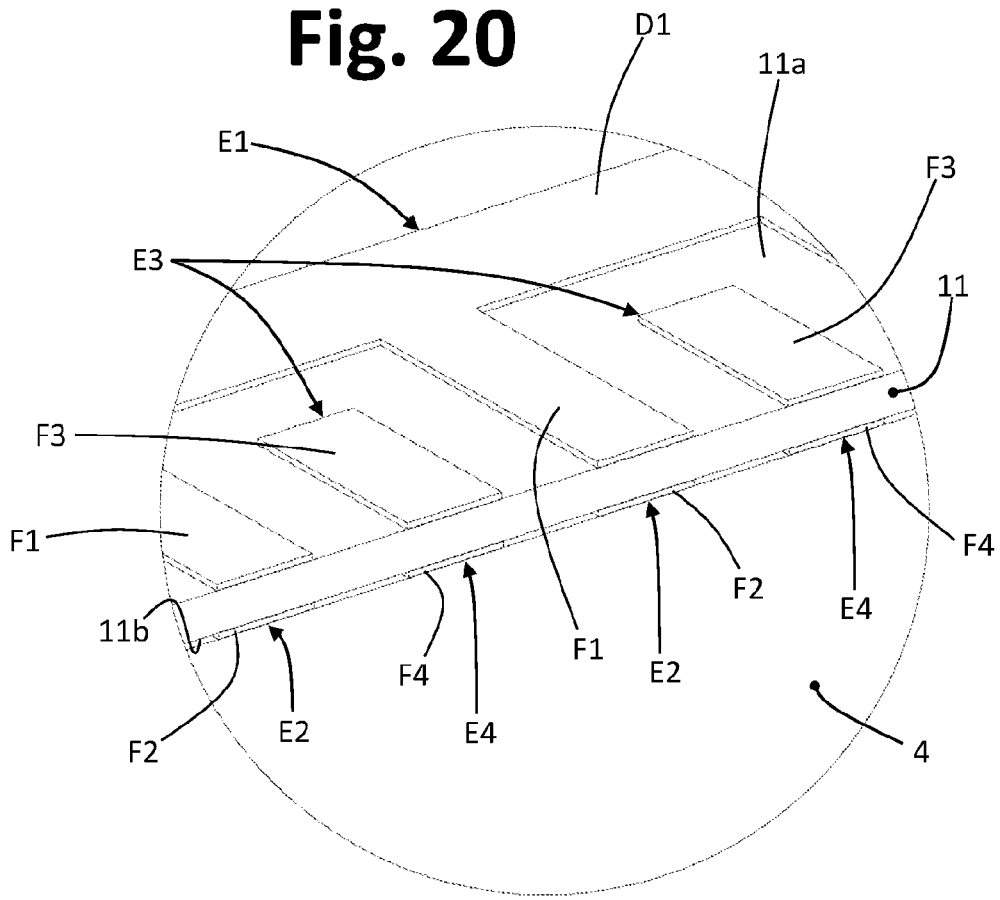
FIG. 20 is a detail at a larger scale of FIG. 19.

Visible in FIG. 16 is a portion of a base 4 where a transducer 10 is located, which, as has been said, comprises the piezoelectric layer 11, with at least two lower comb-like electrodes (here not visible) in an interdigitated or alternating configuration, and at least two upper comb-like electrodes E1 and E3 in an interdigitated or alternating configuration. The area of the layer 11—which may, for example, be comprised between 1 and 600 mm², preferably between 2 and 100 mm²—is such as to cover the bottom lower electrodes E2, E4, or at least the prevalent part of their fingers F2 and F4.

From the cross-sectional views of FIGS. 17-20 it may be noted how, in various embodiments, the fingers F of the various electrodes E are substantially symmetrical and in mutually facing or opposed positions. In particular, each finger F1 of the upper electrode E1 is in a position substantially superimposed to, or aligned with, a respective finger F2 of the lower electrode E2, and preferably has a shape and size that are substantially the same as those of the latter; likewise, each finger F3 of the upper electrode E3 is in a position substantially superimposed to, or aligned with, a respective finger F4 of the lower electrode E4, and preferably has a shape and size that are substantially the same as those of the latter.

With reference, for example, to FIG. 21, in embodiments of this type, the adjacent fingers F1 and F3 of the upper electrodes E1 and E3 extend substantially at a first distance $D_1$ from one another, whereas the distance $D_2$ between two successive fingers F1 of the electrode E1, and, respectively, between two successive fingers F3 of the electrode E3, is substantially not less than twice the first distance $D_1$, preferably substantially twice the distance $D_1$. On the other side, also the adjacent fingers F2 and F4 of the bottom electrodes E2 and E4 extend substantially at the aforesaid first distance $D_1$ from one another, and the distance $D_2$ between two successive fingers F2 of the electrode E2, and, respectively, between two successive fingers F4 of the electrode E4, is likewise substantially not less than twice the first distance $D_1$, preferably substantially twice the distance $D_1$.

The piezoelectric layer 11 is preferentially made of a ceramic material, such as a PZT (lead zirconate titanate), which must previously be subjected to a polarization process, in particular when it is necessary to obtain polarization of the piezoelectric material with an orientation different from the one for subsequent mechanical excitation. For this purpose, between at least one of the lower electrodes E2 and E4, on one side, and at least one of the upper electrodes E1 and E3, on the other side, an electrical field (indicatively comprised between 1 and 5 kV/mm) is applied such as to orient the electric dipoles inside the layer 11 all in the same direction (this operation being in general known as "poling"). As is known, for carrying out the polarization step, the transducer 10—or its layer 11—is normally heated to a given temperature, for example comprised between the 120° C. and 140° C., normally in any case less than the Curie temperature, which varies according to the piezoelectric material chosen (here the case is considered of a piezoelectric ceramic with a Curie temperature of approximately 350° C.). After this temperature has been reached, the voltage is applied for a certain lapse of time, for example comprised between 1 and 50 minutes, preferably between 10 and 20 minutes, this voltage then being maintained also during subsequent cooling of the material when heating ceases.

It is to be recalled that the piezoelectric effect (i.e., the capacity of a material to present a potential difference when it undergoes mechanical stress, or else its capacity to undergo deformation when it is subjected to an electrical field, is essentially based upon distortions of its crystal lattice. A very common type of piezoelectric ceramic, such as PZT, is distinguished by a face-centred cubic (FCC) lattice when it is at a temperature higher than the Curie temperature, where at the vertices of the faces there are metal atoms (for example, lead atoms), at the centre of the faces there are oxygen atoms, and at the centre of the lattice there is an atom heavier than oxygen (for example, titanium or zirconium). Below the Curie temperature the lattice is tetragonal or rhombohedral, according to the relative percentage of titanium and zirconium. Normally, concentrations close to 50% are used, where both phases are present. It might be advantageous to use PZT compositions unbalanced on titanium, which present higher Curie temperatures, for example with approximately 60% titanium and 40% zirconium. In the case where temperatures in the region of 200° C. are not exceeded it is in any case advisable to remain in the proximity of the boundary between the morphotropic zones, which are comprised between 45% and 55% of relative concentration, preferably for a relative concentration of 52% titanium. It is moreover advantageous to use dopants, for example niobium, to improve the response of the piezoelectric sensors (preferred concentration of less than 1 wt %).

The heavier central atom can assume an asymmetrical stable position, causing an imbalance in the charges that results in formation of an electric dipole. The piezoelectric materials are hence polarized by means of an intense electrical field, normally supported by heating, which orients the dipoles thereof as desired, and causes a collective polarization that is stable in the limits of mechanical, thermal, or electrical stress of the material. At the end of the polarization process, the lattice of the material is distorted and reacts to mechanical or electrical stresses with the same mechanism of displacement of mass and charge, and generates a variation of charge on its surfaces. If the material is not polarized, the phenomenon occurs even so but, since the various domains are arranged randomly, the various effects cancel out.

Polarization is in the plane of the piezoelectric layer 11, in a direction alternating between polarization electrodes at the positive potential (+) and electrodes at the negative potential (−). It has recently been proven how the polarization step causes migration of the oxygen vacancies towards the polarization pole at the negative potential (see, for example, G. Holzlechner et al., "*Oxygen vacancy redistribution in PbZrxTi1−xO3 (PZT) under the influence of an electric field*", in Solid State Ionics 262:625-629, 2014). It has moreover been proven how a greater concentration of oxygen vacancies causes a reduction in polarization of the piezoelectric ceramic (see, for example, A. B., Joshi et al., "*Effect of oxygen vacancies on crystallisation and piezoelectric performance of PZT*", in Ferroelectrics Vol. 494, 117-122, 2016.

In the specific case considered herein, there will hence be obtained a higher quality of the piezoelectric material of the layer 11 in the proximity of the electrodes that, during polarization, have been set at the positive potential: by "quality of the material" is understood in this case a more orderly structure of the crystal lattice, due to a lower concentration of oxygen vacancies or, conversely, to a higher concentration of oxygen ions, which, in the ideal case, come to occupy all the sites available O in a form of crystal, for example of the type $ABO_3$, where in the most common case, which is that of PZT, A corresponds to lead (A=Pb) and B corresponds to zirconium or titanium (B=Zr, or else B=Ti). Polarization of the material is hence more intense in the proximity of the electrodes connected to the positive potential, where the (negative) oxygen ions have migrated, leaving the (positive) oxygen vacancies in the proximity of the electrodes connected to the negative potential.

According to a further preferential aspect of the invention, polarization of the piezoelectric layer 11 is obtained with a configuration of electrical connection of the various upper and lower comb-like electrodes that differs from the configuration of electrical connection of the same electrodes that is subsequently used when the piezoelectric transducer 10 is employed for detecting a shear stress.

In other words, the layer 11 is provided with electrodes that serve at least in part both for the purposes of polarization of the layer of piezoelectric material and for the purposes of a subsequent measurement or detection of an electrical signal generated by the layer 11 itself.

FIG. 21 is, precisely, a schematic representation of a possible step of polarization of a transducer 10, or its piezoelectric layer 11, where the electrodes E1 and E2 are electrically connected together to the negative potential (−), whereas the electrodes E3 and E4 are electrically connected together to the positive potential (+) and are electrically insulated from the electrodes E1 and E2. The oxygen ions will hence tend to concentrate in the proximity of the areas comprised between the fingers F3 and F4, in part in the area underlying the electrodes and in part in the area without electrodes, between the pairs of fingers F3-F4 and F1-F2 in the area closest to F3-F4, which is positively charged, whereas the oxygen vacancies will tend to concentrate in the proximity of the areas comprised between the fingers F1 and F2, in part in the area underlying the electrodes and in part in the area without electrodes, between the pairs of fingers F3-F4 and F1-F2 in the area closest to F1-F2, which is negatively charged.

In FIG. 21 the small arrows VP at the centre of the layer 11 represent by way of example the polarization vectors, determined by application of the potential difference between the electrodes E1 and E3, on one side, and the electrodes E2 and E4, on the other side. As may be appreciated, the polarization axis, designated by PA, extends in the direction W; i.e., it is transverse to the longitudinal direction L. The areas of the piezoelectric material that extend axially (direction H) between each pair of stacked fingers F1-F2 and F3-F4 are less polarized than the areas of the material that extend in a transverse direction (direction W) between the aforesaid pairs of fingers: this is basically due to the deformation of the polarized areas that are set between the aforesaid pairs of fingers, which tend to thin out and lengthen.

FIG. 22 illustrates, instead, how, in subsequent use of the transducer 10 for detection purposes, the electrodes E1-E4 are exploited with a configuration of electrical connection that differs from the one used in the step of polarization of the layer 11.

In particular, the upper electrodes E1 and E3 are electrically connected together (here, purely by way of example, to the positive potential +), whereas the lower electrodes E2 and E4 are electrically connected together (here, purely by way of example, to the negative potential −) and are electrically insulated from the other two electrodes E1 and E3. In this way, a shear stress induced in the piezoelectric layer 11 having at least one component in the longitudinal direction L generates between the electrodes E1 and E3, on one side, and the electrodes E2 and E4, on the other side, a potential difference, the value of which is substantially proportional to the shear stress induced.

FIG. 23 is aimed precisely at highlighting in a schematic way the behaviour of the polarization vectors VP, just two of which are represented schematically at a larger scale. When the layer 11 is subjected to a shear stress SS having at least one component in the direction of extension of the fingers F (here substantially in the longitudinal direction L), and hence substantially transverse or perpendicular to the polarization axis, an anisotropic rotation of the vectors VP occurs, which causes onset of a charge between the top electrodes E1 and E3 and the bottom electrodes E3 and E4.

It will hence be appreciated that, by providing on the supporting base 4 a number of transducers 10 oriented in different ways, it is possible to detect both the magnitude of the stresses induced in the housing 2 by the bearing 3 and the direction of such stresses. In the case exemplified in FIG. 7, the transducer 10$_1$ will hence be suited to detecting the loads that act substantially in the longitudinal direction L, whereas the transducer 10$_2$ will be suited to detecting the loads that act substantially in the transverse direction W (and the transducer 20 will be suited to detecting the loads that intervene in the axial direction H). The embodiments described with reference to FIGS. 21-23—distinguished by a symmetrical arrangement between the fingers F1 and F3 of the upper electrodes E1 and E3 and the fingers F2 and F4 of the lower electrodes E2 and E4, with the fingers of the former substantially facing or superimposed to the fingers of the latter—enable in fact detection of deformations of the layer 11 that occur (or have at least one component) in the longitudinal direction L.

This type of operation is based upon the asymmetry of polarization obtained on account of migration of the oxygen vacancies previously mentioned: however, this does not constitute an essential characteristic of the invention, since with different relative positionings between the fingers F and/or different configurations of electrical connection of the electrodes E during polarization and use different operating modes may be obtained.

For instance, FIGS. 24-27 refer to embodiments distinguished by an asymmetrical arrangement between the upper electrodes E1, E3 and the lower electrodes E2, E4, i.e., between the corresponding fingers. From FIG. 24 it may be noted how the general structure of the transducer 10 is substantially similar to the one already described previously, as likewise similar may be the modalities of manufacture, for example using techniques of silk-screen deposition in stacked layers. The arrangement of the fingers F of the electrodes E is, instead, different: in particular, the distance between adjacent fingers of two different electrodes is smaller than the distance between two successive fingers of one and the same electrode.

With reference in particular also to FIG. 25, in various embodiments of this type, the adjacent fingers F1 and F3 closer to one another of the upper electrodes E1 and E3 extend (here in the longitudinal direction L) substantially at a first distance $D_1$ from one another, whereas the distance $D_2$ between two successive fingers F1 of the electrode E1 is greater than twice the distance $D_1$ (in the example, approximately three times $D_1$); also the successive fingers F3 of the electrode E3 are substantially at the distance $D_2$ apart. It should be noted that also the adjacent fingers F1 and F3 that are less close to one another of the upper electrodes E1 and E3 extend at a distance $D_3$ apart that is less than the distance $D_2$ ($D_3$, in the example, is approximately twice $D_1$).

On the other side, the adjacent fingers F2 and F4 that are closer to one another of the lower electrodes E2 and E4 extend (here in the longitudinal direction L) substantially at the aforesaid first distance $D_1$ from one another, and the successive fingers F2 of the electrode E2, respectively the successive fingers F4 of the electrode E4, are substantially at the aforesaid distance $D_2$. Also the adjacent fingers F2 and F4 that are less close to one another of the lower electrodes E2 and E4 extend substantially at the distance $D_3$ from one another.

From FIG. 25 it may likewise be noted how each finger F1 of the electrode E1 is in a position substantially superimposed to, or aligned with, a respective finger F2 of the electrode E2, and each finger F3 of the electrode E3 is in a position substantially superimposed to, or aligned with, a respective finger F4 of the electrode E4.

Also in this case, polarization of the piezoelectric layer 11 is obtained with a configuration of electrical connection of the various electrodes that differs from the configuration of electrical connection that will then be used when the piezoelectric transducer 10 is to detect a shear stress.

In fact, FIG. 25 represents schematically a possible step of polarization of the transducer 10, i.e., of the piezoelectric layer 11, during which the electrodes E1 and E2 are electrically connected together to the negative potential (−), and the electrodes E3 and E4 are electrically connected together to the positive potential (+) and electrically insulated from the other two electrodes E1 and E2. Also in this case, the arrows VP at the centre of the layer 11 represent by way of example the polarization vectors, which are determined by application of the potential difference between the electrodes E1 and E2, on one side, and the electrodes E3 and E4, on the other side.

FIG. 26 illustrates, instead, how, during effective use of the transducer 10 for purposes of detection of a shear stress, the configuration of electrical connection of the electrodes E1-E4 is different from the one used during polarization of the layer 11. In particular, the upper electrodes E1 and E3 are electrically connected (here, purely by way of example) to the positive potential (+), and the lower electrodes E2 and E4 are electrically connected (here, purely by way of example) to the negative potential (−) and are electrically insulated from the other two electrodes E1 and E3.

In this way, as exemplified in FIG. 27, a shear stress SS induced in the layer 11 in a direction transverse to the longitudinal direction L (i.e., in the direction W), generates between the electrodes E1 and E3, on one side, and the electrodes E2 and E4, on the other side, a potential difference of a value proportional to the aforesaid shear stress SS. The variation of the polarization vector that generates a charge on the electrodes can be viewed as a rotation of the polarization vector caused by the shear stress. Reading could also be made by connecting just one pair of electrodes on the opposite faces, for example the electrodes E1 and E2.

Hence, as may be appreciated, by providing on the base 4 a first transducer 10 according to FIGS. 16-22 and a second transducer 10 according to FIGS. 24-27, but with the respective fingers F all oriented in the longitudinal direction L, it will in any case be possible to detect both the loads that act substantially in the longitudinal direction L (via the first transducer) and the loads that act substantially in the transverse direction W (via the second transducer).

FIGS. 28-30 refer to other embodiments, distinguished by an asymmetrical arrangement between the upper electrodes E1, E3 and the lower electrodes E2, E4, i.e., between the corresponding fingers F, in particular, an arrangement where the fingers of at least one of the upper electrodes E1, E3 are staggered with respect to the fingers of at least one of the lower electrodes E2, E4 in the direction W.

The general structure of the transducer 10 is substantially similar to the one illustrated with reference to the previous figures, apart from the aforementioned staggered arrangement, as likewise similar may be the modalities of manufacture, for example using techniques of silk-screen deposition in stacked layers. From FIGS. 28-30 there may be appreciated, in fact, the different arrangement of the fingers F of the electrodes E: also in this case, the distance between the adjacent fingers of two different electrodes is smaller than the distance between two successive fingers of one and the same electrode, but the fingers F of an upper electrode are at least in part in a staggered position with respect to the fingers F of a lower electrode.

With reference, in particular, to FIG. 28, in various embodiments of this type, the adjacent fingers F1 and F3 that are closer to one another of the upper electrodes E1 and E3 extend (here in the longitudinal direction L) substantially at a first distance $D_1$ from one another, whereas the distance $D_2$ between two successive fingers F1 of the electrode E1 is greater than twice the distance $D_1$ (in the example, approximately three times $D_1$); also the successive fingers F3 of the electrode E3 are substantially at the distance $D_2$ apart. It should be noted that also the adjacent fingers F1 and F3 that are less close to one another of the upper electrodes E1 and E3 extend at a distance $D_3$ apart that is less than the distance $D_2$ (in the example, $D_3$ is approximately twice $D_1$). On the other side, the adjacent fingers F2 and F4 that are closer to one another of the lower electrodes E2 and E4 extend (here in the longitudinal direction L) substantially at the first distance $D_1$ from one another, and the successive fingers F2 of the electrode E2, respectively the successive fingers F4 of the electrode E4, are substantially at the distance $D_2$ apart. Also the adjacent fingers F2 and F4 that are less close to one another of the lower electrodes E2 and E4 extend substantially at the distance $D_3$ apart.

What differentiates the arrangement of FIGS. 28-30 from that of FIGS. 21-22 and 25-27 is that each finger F3 of the upper electrode E3 is in a staggered position with respect to a respective finger F4 of the lower electrode E4, and each finger F1 of the upper electrode E1 is in a staggered position with respect to a respective finger F2 of the lower electrode E2, preferably with each finger F1 of the upper electrode E1 in a position substantially superimposed to, or aligned with, a respective finger F4 of the lower electrode E4. More in general, each finger F of one of the two upper electrodes E1 and E3 is in a position substantially superimposed to, or aligned with, a respective finger F of one of the two lower electrodes E2 and E4, whereas each finger F of the other one of the two upper electrodes E1 and E3 is in a position substantially staggered with respect to a respective finger F of the other one of the two lower electrodes E2 and E4. As has been said, in the example illustrated, the fingers F1 of the upper electrode E1 are in a position superimposed to, or aligned with, the fingers F4 of the lower electrode E4, whereas the fingers F3 of the upper electrode E3 are in a staggered position with respect to the fingers F2 of the lower electrode E2.

Also in this case, polarization of the piezoelectric layer 11 is obtained with a configuration of electrical connection of the various electrodes that differs from the configuration used when the piezoelectric transducer 10 is employed for detecting a shear stress.

In fact, FIG. 28 represents schematically the step of polarization of the transducer 10, or of the piezoelectric layer 11, during which the four electrodes E1, E2, E3, and E4 are electrically insulated from one another, and the potential difference is applied between one of the two upper electrodes—here the electrode E3, set at the positive potential (+)—and one of the two lower electrodes—here the electrode E2, set at the negative potential (−)—where the two electrodes to which the potential difference is applied are preferably those whose fingers F are in a staggered position with respect to one another (here the fingers F3 and F2 of the electrodes E3 and E2). Again, the arrows VP at the centre of the layer 11 represent by way of example the polarization vectors, determined by application of the potential difference between the electrodes E3 and E2. A signal corresponding to the shear stress would be obtained also by carrying out the polarization step between the electrodes E1 and E4 and then measuring the deformation between the electrodes E3 and E2, but there would be a greater effect on the signal from the normal compression, which, instead, it would in general be desirable to decouple.

The polarization vectors VP may have a different value in the presence of a different distance between the fingers F3 of the electrodes E3 set at the positive potential (+) and respective fingers F2 of the lower electrodes E2 set at the negative potential (−); the layer 11 may have areas with different polarization.

FIG. 29 illustrates, instead, how, during effective use of the transducer 10, the electrodes E1-E4 are electrically connected in a configuration different from the one used during polarization of the layer 11. In particular, the four electrodes E1, E2, E3, and E4 are always electrically insulated from one another, and between the electrodes E1 and E4 the potential difference induced in the layer 11 following upon a shear stress is detected (in the non-limiting example illustrated, the electrode E1 detects the negative potential − and the electrode E4 detects the positive potential +). It will hence be appreciated that, preferentially, the electrodes E used for the purposes of detection of a shear stress are the electrodes, the fingers of which are in a position substantially set on top of, or aligned to, one another.

In this way, as exemplified in FIG. 30, a shear stress SS induced in the layer 11 in a direction transverse to the longitudinal direction L generates between the electrodes E1 and E4 a potential difference having a value proportional to the aforesaid shear stress SS. The variation of the polarization vector that generates a charge on the electrodes may be viewed as a rotation of the polarization vector caused by the shear stress.

In various examples of embodiment described previously, associated to the piezoelectric layer 11 are two upper comb-like electrodes E1 and E3 and two lower comb-like electrodes E2 and E4: however, in other embodiments, the number of comb-like electrodes could be greater and/or the number of upper electrodes and/or fingers could be different from the number of lower electrodes and/or fingers.

Of course, also the piezoelectric layer 21 of a transducer 20 must be previously subjected to polarization. In the case of the piezoelectric layer 21, the corresponding polarization axis PA extends in a direction (H) transverse to a plane identified by the layer 21, as represented in FIG. 15: in this case, the electrodes used during measurement coincide with those used during polarization.

As has been mentioned previously—see, for example, FIG. 7—preferably associated to the sensorized supporting base 4 is a cable 5 for electrical connection to an external system. The connector 5b of the cable 5 has a respective connector body, which is mechanically associated to at least one of the housing 2 and the base 4 and is configured for coupling with the terminals C (see FIGS. 7 and 8), each having one end in electrical contact with a respective pad P provided on the plate 4. FIG. 7 exemplifies the case of ten terminals C, but evidently this number depends upon the number and type of piezoelectric transducers provided (whether with two or four or six electrodes E, etc.), possibly with some connections in common. The cable 5, with the connectors 5a and 5b, may advantageously be exploited for connection to a production equipment used for the purposes of carrying out the polarization step, i.e., with a first configuration of electrical connection in line with what has been described previously. Subsequently, upon installation of the device 1, the same cable 5 may be exploited for electrical connection of the transducers 10 and/or 20 to an external system that uses the corresponding detections, with a second configuration of electrical connection in line with what has been described previously.

In various embodiments, the sensorized supporting base is installed in a configuration set upside down with respect to the one previously exemplified, or with its detection surface resting on the mounting structure S, either directly or via interposition of at least one further element. Also in this case, the base 4 is preferably set at least in part between the housing 2 and the mounting structure S.

In various embodiments of this type, in the assembled condition of the device 1, resting on the surface 4d of the base 4 opposite to the detection surface 4c is (either directly or with interposition of some other possible element) a lower surface of the housing, for example the bottom surface 6a of the seat 6; on the other side, the detection surface 4c of the base rests (either directly or with interposition of another possible element) on the surface Sa of the structure S.

Figure 31:
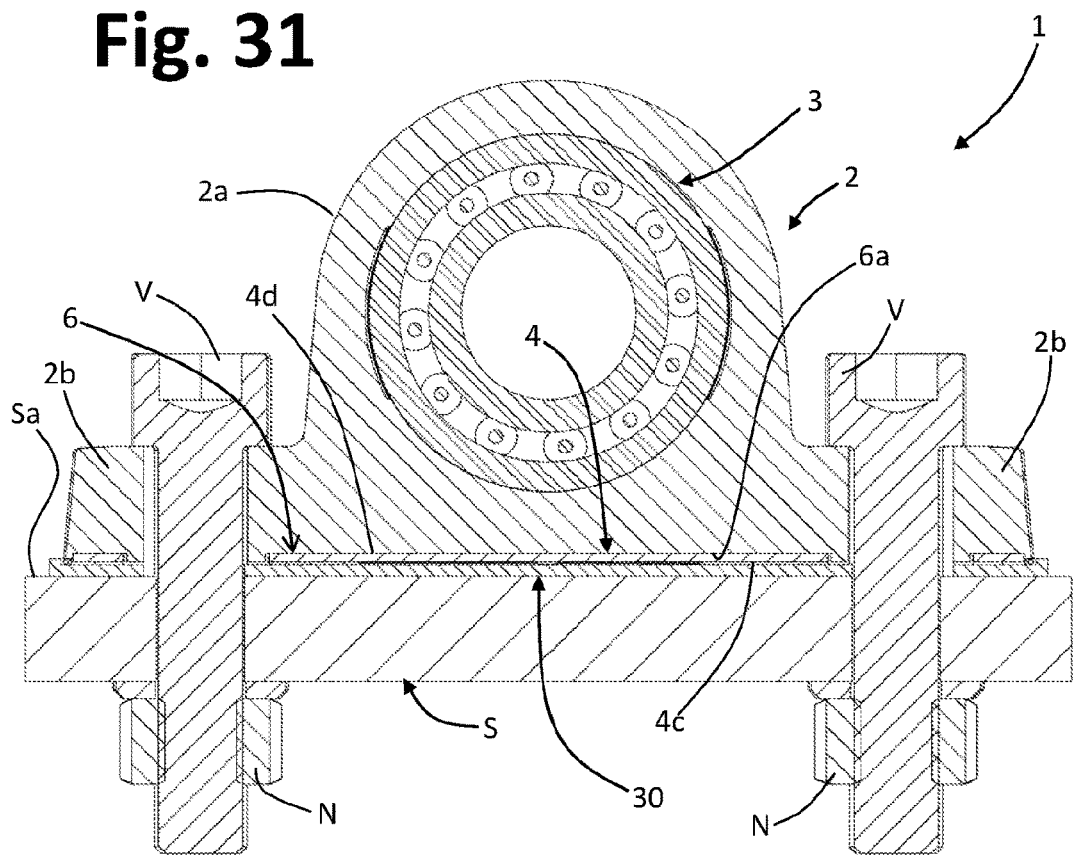
FIG. 31 is a schematic cross-sectional view of a sensorized supporting device for bearings according to other possible embodiments of the invention, mechanically secured to a generic mounting structure.
Figure 32:
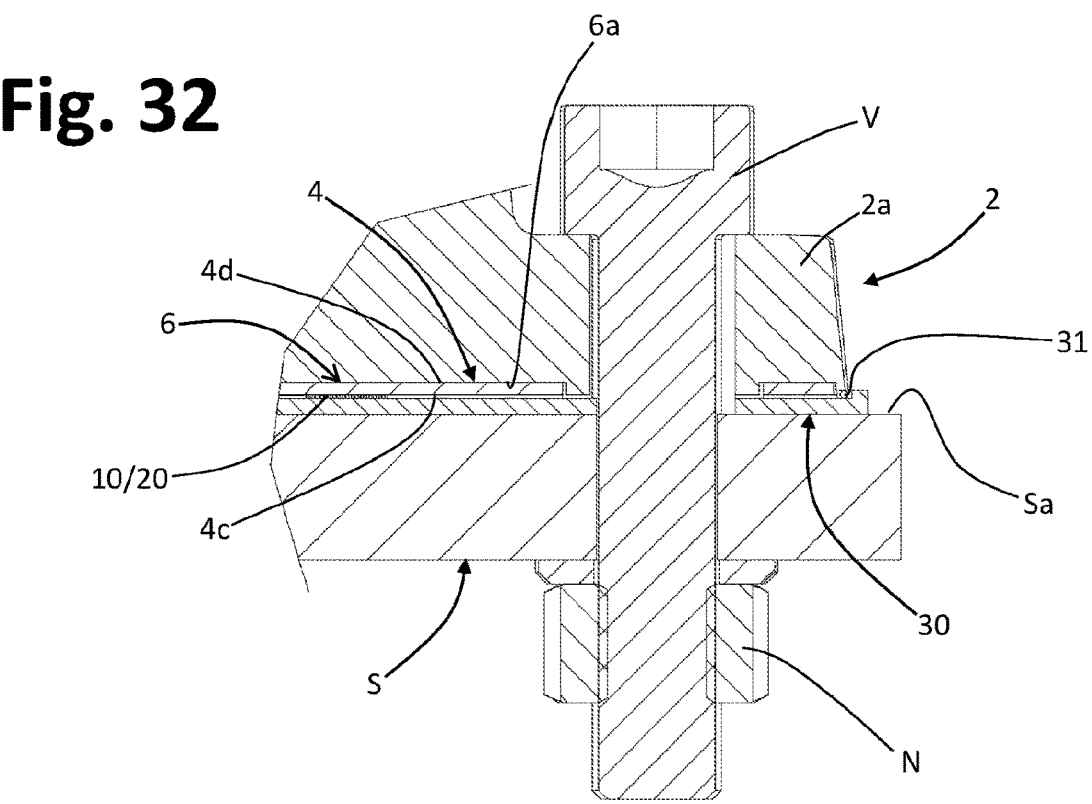
FIG. 32 is a detail at a larger scale of FIG. 31.

An embodiment of this type is exemplified in FIGS. 31 and 32, where the base 4 is set within the seat 6, with its surface 4d in contact with the lower surface 6a of the aforesaid seat 6. Also in this case, between the two surfaces 4d and 6a there may in any case be set a further element, for example a layer of resin. Preferably, the base 4 is in a substantially fixed position relative to the housing 2.

The detection surface 4c of the base, or the at least one sensor means 10 and/or 20, rests, instead, on an intermediate element, here constituted by a lower lid 7' of the housing 2, which in turn rests on the surface Sa of the structure S, with the lid that closes the seat 6 underneath, when this seat is provided. Such a lower lid could be present also in the embodiments described previously.

The lower lid 7' may be mounted in a fixed position relative to the structure S and/or be able to perform relative displacements with respect to the bearing housing 2, for example by providing a compliant element 7" (such as a perimetral gasket) between the housing 2 and the lid 7'. The lid 7' could, on the other hand, also be fixed with respect to the housing 2, for example welded thereto along the edges, but in any case be slightly flexible in the area of the sensor means. Instead of the lid 7', there could in any case be provided a layer of adhesive or resin. However, also in this case the arrangement is such that the stress-sensor means of the base 4 are able to detect vibrations and/or relative movements or displacements between the bearing housing 2 and the mounting structure S or the lid 7', or else relative displacements between the base 4 and the bearing housing 2 or the lid 7' or the mounting structure S.

It will be appreciated that operation of the sensorized supporting device 1 of FIGS. 31-32 is conceptually similar to what has already been described previously.

From the foregoing description, it may be appreciated how production and operation of the sensorized supporting device according to the invention are simple and reliable.

As has been seen, preferentially provided on the sensorized supporting base are a number of piezoelectric transducers: unlike piezoresistive sensors, which have to be supplied electrically and enable detection only of generic deformations, the piezoelectric transducers provided according to the invention do not require electrical supply and enable detection also of the directions of the stresses. The piezoelectric transducers provided according to the invention enable signals to be obtained of relatively high potential difference or voltage albeit in the presence of minimal deformations, unlike piezoresistive sensors, which require relatively high deformations for inducing significant variations of resistance and consequently significant variations of voltage (for this reason piezoresistive sensors typically require complex mechanical amplification means).

The transducers may be appropriately distributed according to the detection requirements, and may comprise, for example, two transducers, which are designed to detect shear stresses and are arranged orthogonal with respect to one another, in particular for detecting stresses in two directions parallel to the resting plane of the mounting structure S (directions L and W), and possibly a piezoelectric pressure transducer, in particular for detecting stresses in a direction orthogonal to the resting plane (direction H). In principle, with one normal-stress transducer of the type designated by 20 and two shear-stress transducers of the type designated by 10 (for example, two transducers $10_1$ and $10_2$ that are the same as one another but oriented at 90° with respect to one another, as in FIG. 7) it is possible to reconstruct a three-dimensional mapping of the stresses to which the bearing is subjected. The piezoelectric transducers proposed enable detection of extremely limited deformations, of the order of nanometres: it is hence not necessary for the bearing housing to move significantly.

In fact, a substantial advantage of the preferred solution is represented by the fact that the detection system proposed enables detection of stresses in bearings, in particular rolling bearings, distinguishing also a directionality in the stress. In this regard, it is to be noted that traditional diagnostics of rolling bearings may also be made by detecting generic vibrations of the housing of the bearing, without being able, however, to identify the spatial directionality thereof: even though the overall level of the vibration may be used for evaluating deterioration of the bearing, in particular for detecting non-cyclic faults, it may not be sufficient for identifying faults or improper uses at an initial stage. Cyclic faults, which may arise in the inner ring, in the outer ring, in the rolling bodies, or in the cage of the bearing, produce components of vibration at specific frequencies. These frequencies are a function of the geometry of the bearings and of the velocity of rotation and can be identified via analysis of vibrations in the frequency domain. The preferential solution proposed according to the invention makes it possible to add to this type of analysis spatial directionality, identifying, for example, a load applied in an improper way.

A spectral analysis in a number of dimensions made in real time, with a sensorized supporting device for bearings according to the invention, may prove particularly useful in order to have available information on the dynamics of a mechanical system associated to a bearing, for example in a motor vehicle (a stability-control system, a braking system, etc.) or in other contexts (electric-motor drives, industrial apparatuses, electrical household appliances, etc.).

Another advantage of the detection device described, according to preferential embodiments, is represented by the fact that the at least one shear-stress transducer can be prearranged, right from the start, with a given structure of the electrodes, which is exploited both during production, for the purposes of polarization of the material, in a first configuration of electrical connection, and subsequently also during final use for purposes of detection, in a second configuration of electrical connection. In this way, there is no longer the problem of having to provide in a first manufacturing step the polarization electrodes and in a subsequent manufacturing step the detection electrodes; i.e., it is not necessary to resort to complicated assembly operations and replacements of electrodes, which is typical, instead, of the prior art (see, for example, Marcelo Areias Trindade, et al., "*Evaluation of effective material properties of thickness-shear piezoelectric macro fibre composites*", in Proceedings of COBEM 2011, 21st International Congress of Mechanical Engineering, Oct. 24-28, 2011, Natal, RN, Brazil). The invention hence also affords a simplification of the equipment and/or of the production processes.

The preferred process of production of the at least one shear-stress transducer, based upon successive deposition of layers of material, preferably with screen-printing techniques, makes it possible to obtain in a simple way and at a low cost a very compact sensorized supporting base, with miniaturization of the corresponding sensor means.

It is clear that numerous variations may be made by the person skilled in the art to the device described by way of example, without thereby departing from the scope of the invention as defined by the ensuing claims. It is likewise clear that individual characteristics disclosed with reference to embodiments described previously may be combined with one another in other embodiments.

As has been mentioned, the substantially rectilinear shape of the fingers F, albeit preferable, does not constitute an essential characteristic. The fingers could, in fact, have a development distinguished by stretches that are curved and/or angled with respect to the longitudinal direction L, such as S-shaped or zigzag-shaped electrodes.

The distances mentioned in the examples previously provided, such as the distances $D_1$ and/or $D_2$ and/or $D_3$, are to be understood preferential but non-limiting; i.e., the distances between the fingers of the electrodes and/or the corresponding alignment or staggering of the above elements could be different from those shown to by way of example of example. In the non-limiting examples provided, the polarization and the shear-stress detections have been described with reference to the fingers F, which extend in one and the same direction (here the longitudinal direction L). However, also other portions of the electrodes E could contribute to detection, such as the portions D of the electrodes that join the fingers F, in particular in the case of shear stresses having at least one component in the direction of extension of the fingers (as in the case of FIG. 23). More in general, in various embodiments, the electrodes E may envisage both first portions F that extend in a first direction (here the direction of length L) and second portions D that extend in a direction transverse to the aforesaid first portions F (herein the width direction W), with the aforementioned portions D and F of the electrodes E that can participate in polarization and/or in measurement.

The electrodes could be shaped so as to extend, instead of in at least one of a longitudinal direction (L) and a width direction (W) of the layer of piezoelectric material 11, in a direction angled or diagonal with respect to the above two directions.

In various preferred embodiments of the sensorized supporting device according to the invention, the signals generated by the at least one piezoelectric sensor provided are supplied directly to a corresponding electrical connector so as to be detected by an external system (for example, a control unit), thus avoiding the need to supply the device electrically. However, in other possible embodiments, the sensorized supporting base or the supporting device that comprises it may include a circuit arrangement (e.g., on the supporting base itself), for example for amplification and/or processing and/or transmission of the signals; in this case, the aforesaid circuit arrangement will preferentially comprise a corresponding electrical supply stage for the amplification and/or processing and/or transmission components, it remaining in any case understood that the at least one piezoelectric sensor provided on the sensorized base does not in any case require electrical supply.

The features listed below regard preferred embodiments of the piezoelectric transducers comprising at least four electrodes described previously.

1. A piezoelectric transducer, wherein the portions or fingers (F1, F3) of the first and third electrodes (E1, E3) extend at least in the longitudinal direction (L) substantially at a first distance ($D_1$) from one another, and the portions or fingers (F1) of the first electrode (E1), respectively. the portions or fingers (F3) of the third electrode (E3), are at a distance ($D_2$) apart that is substantially not less than twice the first distance ($D_1$), preferably substantially twice the first distance ($D_1$), the portions or fingers (F2, F4) of the second and fourth electrodes (E2, E4) extend at least in the longitudinal direction (L) substantially at the first distance ($D_1$) from one another, and the portions or fingers (F2) of the second electrode (E2), respectively, the portions or fingers (F4) of the fourth electrode (E4), are at a distance apart ($D_2$) that is substantially not less than twice the first distance ($D_1$), preferably substantially twice the first distance ($D_1$); and preferably each portion or finger (F1) of the first electrode (E1) is in a position substantially superimposed ro, or aligned with, a respective said portion or finger (F2) of the third electrode (E2), and each portion or finger (F3) of the third electrode (E3) is in a position substantially superimposed to, or aligned with, a respective said portion or finger (F4) of the fourth electrode (E4).

2. The piezoelectric transducer as per point 1, wherein the first and third electrodes (E1, E3), or the respective portions or fingers (F1, F3), are electrically connected together (+), and the second and fourth electrodes (E2, E4), or the respective portions or fingers (F2, F4), are electrically connected together (−) and electrically insulated from the first and third electrodes (E1, E3) in such a way that a shear stress (SS) induced in the layer of piezoelectric material (11) at least in the longitudinal direction (L) will generate between the first and third electrodes (E1, E3), on one side, and the second and fourth electrodes (E2, E4), on the other side, a potential difference having a value proportional to said shear stress (SS).

3. A piezoelectric transducer, wherein:

the portions or fingers (F1, F3) of the first and third electrodes (E1, E3) extend in the longitudinal direction (L) substantially at a first distance ($D_1$, $D_3$) from one another, the portions or fingers (F1) of the first electrode (E1) being at a second distance ($D_2$) apart that is greater than twice the first distance ($D_1$, $D_3$), and the portions or fingers (F3) of the third electrode (E3) being substantially at the second distance ($D_2$) apart, the portions or fingers (F2, F4) of the second and fourth electrodes (F2, F4) extend in the longitudinal direction (L) substantially at the first distance ($D_1$, $D_3$) from one another, the portions or fingers (F2) of the second electrode (E2), respectively the portions or fingers (F4) of the fourth electrode (E4), being substantially at the second distance ($D_2$) apart.

4. The piezoelectric transducer as per point 3, wherein:

each said portion or finger (F1) of the first electrode (E1) is in a position substantially superimposed to, or aligned with, a respective said portion or finger (F2) of the second electrode (E2), and each said portion or finger (F3) of the third electrode (E3) is in a position substantially superimposed to, or aligned with, a respective said portion or finger (F4) of the fourth electrode (E4); or else each said portion or finger (F1) of one of the first and third electrodes (E1, E3) is in a position substantially superimposed to, or aligned with, a respective said portion or finger (F2) of one of the second and fourth electrodes (E2, E4), and each said portion or finger (F3) of the other one if the first and third electrodes (E1, E3) is in a position substantially staggered with respect to a respective said portion or finger (F4) of the other one of the second and fourth electrodes (E2, E4).

5. The piezoelectric transducer as per point 4, wherein:

each said portion or finger (F1) of the first electrode (E1) is in a position substantially superimposed to, or aligned with, a respective said portion or finger (F2) of the second electrode (E2), and each said portion or finger (F3) of the third electrode (E3) is in a position substantially superimposed to, or aligned with, a respective said portion or finger (F4) of the fourth electrode (E4), and the first and third electrodes (E1, E3), or the respective said portions or fingers (F1, F3), are electrically connected together (+), and the second and fourth electrodes (E2, E4), or the respective said portions or fingers (F2, F4), are electrically connected to together (−) and electrically insulated from the first and third electrodes (E1, E3) in such a way that a shear stress (SS) induced in the layer of piezoelectric material (11) in a direction (W) transverse to the longitudinal direction (L) will generate between the first and third electrodes (E1, E3), on one side, and the second and fourth electrodes (E2, E4), on the other side, a potential difference having a value proportional to said shear stress (SS); or else each said portion or finger (F1) of one of the first and third electrodes (E1, E3) is in a position substantially superimposed to, or aligned with, a respective said portion or finger (F2) of one of the second and fourth electrodes (E2, E4), and each said portion or finger (F3) of the other one of the first and third electrodes (E1, E3) is in a position substantially staggered with respect to a respective said portion or finger (F4) of the other one of the second and fourth electrodes (E2, E4), and the first and third electrodes (E1, E3), or the respective said portions or fingers (F1, F3), are electrically insulated from one another, and the third and fourth electrodes (E3, E4), or the respective said portions or fingers (F3, F4), are electrically insulated from one another and with respect to the first and third electrodes (E1, E3), in such a way that a shear stress (SS) induced in the layer of piezoelectric material (11) in a direction (W) transverse to the longitudinal direction (L) will generate between one of the first and third electrodes (E1, E3), on one side, and one of the second and fourth electrodes (E2, E4), on the other side, a potential difference having a value proportional to said shear stress (SS), the one of the first and third electrodes (E1, E3) and the one of the second and fourth electrodes (E2, E4) preferably being the electrodes whose said portions or fingers are in a position substantially set on top of, or aligned to, one another.

6. A method for manufacturing a piezoelectric transducer, comprising the steps of:

i) forming the piezoelectric transducer (10), with the first electrode (E1) and the at least one third electrode (E3, E5), or the respective said portions or fingers, at least in part on the first major face (11a) of the layer of piezoelectric material (11), and with the second electrode (E2) and the at least one fourth electrode (E4, E6), or the respective said portions or fingers, at least in part on the second major face (11b) of the first layer of piezoelectric material (11);

ii) obtaining a polarization of the layer of piezoelectric material (11), by applying a potential difference between:
- at least one of the first electrode (E1) and the at least one third electrode (E3, E5), or the respective said portions or fingers, on one side, and
- at least one of the second electrode (E2) and the at least one fourth electrode (E4, E6), or the respective said portions or fingers, on the other side, wherein step ii) is carried out with a first configuration of electrical connection of the electrodes, or of the respective said portions or fingers, that differs from a second configuration of electrical connection of the electrodes, or of the respective said portions or fingers, which is used when the piezoelectric transducer (10) is subsequently employed for detecting a shear stress.

The invention claimed is:

1. A sensorized bearing-supporting device which comprises:
   a bearing housing, configured for being secured to a mounting structure and defining at least one seat for a bearing; and
   a sensorized supporting base, having a supporting body prearranged for being at least partially positioned between the mounting structure and the bearing housing, directly or via interposition of at least one further element,
   wherein the supporting body has a detection surface which extends in a longitudinal direction and a transverse direction and is configured for resting, directly or via interposition of at least one further element, on a corresponding surface of one of the bearing housing and the mounting structure, the sensorized supporting base being provided with mechanical-stress sensor means,
   wherein the mechanical-stress sensor means comprise at least one piezoelectric transducer defining at least part of the detection surface, the at least one piezoelectric transducer being configured for generating an electrical potential difference that is substantially proportional to the magnitude of a mechanical stress applied to the bearing housing,
   and wherein the at least one piezoelectric transducer comprises a first piezoelectric transducer configured for generating a first electrical potential difference representing a first shear stress, and a second piezoelectric transducer configured for generating a second potential difference representing a second shear stress.

2. The device according to claim 1, wherein the at least one piezoelectric transducer comprises a respective layer of piezoelectric material, and at least one first electrode and one second electrode between which the layer of piezoelectric material extends at least partially.

3. The device according to claim 2, wherein the at least one piezoelectric transducer comprises at least one third electrode and one fourth electrode which extend at a first major face and a second major face of the layer of piezoelectric material, respectively.

4. The device according to claim 3, wherein at least some from among the first electrode, the second electrode, the third electrode and the fourth electrode are polarization electrodes of the layer of piezoelectric material or are both polarization electrodes and measurement electrodes of the layer of piezoelectric material.

5. The device according to claim 2, wherein the first electrode and the second electrode extend at two opposite major faces of the layer of piezoelectric material, respectively.

6. The device according to claim 2, wherein the first piezoelectric transducer and the second piezoelectric transducer are arranged in such a way that:
   the first piezoelectric transducer is designed to detect a shear stress in a first direction, and the second piezoelectric transducer is designed to detect a shear stress in a second direction, the first direction and the second direction being generally transverse or inclined with respect to one another, and/or
   the layer of piezoelectric material of the first piezoelectric transducer has a polarization axis that extends transversally with respect to the longitudinal direction, and/or
   the layer of piezoelectric material of the second piezoelectric transducer has a polarization axis that extends transversally with respect to the transverse direction.

7. The device according to claim 1, wherein the layer of piezoelectric material has a polarization axis that extends transversally with respect to at least one from among the longitudinal direction, the transverse direction and a plane identified by the supporting body.

8. The device according to claim 1, wherein the at least one piezoelectric transducer comprises a deposited layer of piezoelectric material and deposited electrodes of electrically conductive material at two opposite major faces of the deposited layer of piezoelectric material.

9. The device according to claim 1, wherein set between the detection surface and said corresponding surface is at least one intermediate layer or element suitable to transmit mechanical stresses to the sensorized supporting base, such as a polymer, or an adhesive, or a resin, or a lower lid.

10. The device according to claim 1, wherein the supporting body has elements for positioning relative to the bearing housing, and/or vice versa.

11. The device according to claim 1, wherein the bearing housing defines a positioning seat for receiving at least part of the sensorized supporting base.

12. The device according to claim 11, wherein the positioning seat is delimited by a peripheral edge and/or has a substantially plane bottom surface.

13. A method for obtaining a sensorized supporting device according to claim 1, comprising the steps of:
   i) providing the supporting body of the sensorized supporting base, with a substantially plane detection surface;
   ii) forming the at least one piezoelectric transducer, with at least one first electrode at least in part at a first major face of the layer of piezoelectric material, and with at least one second electrode at least in part at a second major face of the layer of piezoelectric material;
   iii) performing a polarization of the layer of piezoelectric material;
   iv) setting the sensorized supporting base between a mounting structure and the bearing housing.

14. A sensorized bearing-supporting device which comprises:
   a bearing housing, configured for being secured to a mounting structure and defining at least one seat for a bearing; and a sensorized supporting base, having a supporting body prearranged for being at least partially positioned between the mounting structure and the bearing housing, directly or via interposition of at least one further element, wherein the supporting body has a detection surface which extends in a longitudinal direction and a transverse direction and is configured for resting, directly or via interposition of at least one further element, on a corresponding surface of one of the bearing housing and the mounting structure, the sensorized supporting base being provided with mechanical-stress sensor means, wherein the mechanical-stress sensor means comprise at least one piezoelectric transducer defining at least part of the detection surface, the at least one piezoelectric transducer being configured for generating an electrical potential difference that is substantially proportional to the magnitude of a mechanical stress applied to the bearing housing, and wherein the at least one piezoelectric transducer comprises at least one of a piezoelectric transducer configured for generating an electrical potential difference substantially proportional to a shear stress applied to the bearing housing and a piezoelectric transducer configured for generating an electrical potential difference substantially proportional to a normal stress applied to the bearing housing.

15. A method for detecting stresses of a bearing housing, comprising the steps of:
 i) providing a sensorized supporting device according to claim 14;
 ii) securing the bearing housing to a mounting structure, with the supporting body of the sensorized supporting base at least partially set therebetween;
 iii) generating, via the at least one piezoelectric transducer, an electrical potential difference that is substantially proportional to at least one of a shear stress and a normal stress transmitted to the bearing housing.

16. A sensorized bearing-supporting device which comprises:
 a bearing housing, configured for being secured to a mounting structure and defining at least one seat for a bearing; and
 a sensorized supporting base, having a supporting body prearranged for being at least partially positioned between the mounting structure and the bearing housing, directly or via interposition of at least one further element,
 wherein the supporting body has a detection surface which extends in a longitudinal direction and a transverse direction and is configured for resting, directly or via interposition of at least one further element, on a corresponding surface of one of the bearing housing and the mounting structure, the sensorized supporting base being provided with mechanical-stress sensor means,
 wherein the mechanical-stress sensor means comprise at least one piezoelectric transducer defining at least part of the detection surface, the at least one piezoelectric transducer being configured for generating an electrical potential difference that is substantially proportional to the magnitude of a mechanical stress applied to the bearing housing,
 wherein the at least one piezoelectric transducer comprises a respective layer of piezoelectric material, and at least one first electrode and one second electrode between which the layer of piezoelectric material extends at least partially,
 and wherein the first electrode and the second electrode of the at least one piezoelectric transducer each have a plurality of portions or fingers which extend at a first major face and a second major face of the layer of piezoelectric material, respectively.

17. The device according to claim 16, wherein
 the at least one piezoelectric transducer comprises at least one third electrode and one fourth electrode which extend at a first major face and a second major face of the layer of piezoelectric material, respectively;
 the third electrode has respective portions or fingers that are in a configuration interdigitated or alternating with the portions or fingers of the first electrode, and the fourth electrode has respective portions or fingers that are in a configuration interdigitated or alternating with the portions or fingers of the second electrode.

18. The device according to claim 17, wherein the first electrode, the second electrode, the third electrode and the fourth electrode are substantially comb-like electrodes.

19. A sensorized supporting base for bearing housings, having a supporting body that is prearranged for positioning between a mounting structure and a bearing housing, the supporting body having a detection surface, which extends in a longitudinal direction and a transverse direction and is configured for resting, directly or via interposition of at least one further element, on a corresponding surface of one of the bearing housing and the mounting structure, the sensorized supporting base being provided with mechanical-stress sensor means,
 wherein the mechanical-stress sensor means comprise at least one piezoelectric transducer defining at least part of the detection surface, the at least one piezoelectric transducer being configured for generating an electrical potential difference that is substantially proportional to the magnitude of a mechanical stress applied to the bearing housing
 and wherein the at least one piezoelectric transducer comprises a deposited layer of piezoelectric material and deposited electrodes of electrically conductive material at two opposite major faces of the deposited layer of piezoelectric material.

* * * * *